United States Patent
Lee

(10) Patent No.: US 11,770,804 B2
(45) Date of Patent: Sep. 26, 2023

(54) METHOD AND DEVICE FOR RESERVING RESOURCE IN NR V2X

(71) Applicant: LG Electronics Inc., Seoul (KR)

(72) Inventor: Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/712,443

(22) Filed: Apr. 4, 2022

(65) Prior Publication Data

US 2022/0232525 A1 Jul. 21, 2022

Related U.S. Application Data

(63) Continuation of application No. PCT/KR2021/004572, filed on Apr. 12, 2021.
(Continued)

(30) Foreign Application Priority Data

| May 29, 2020 | (KR) | ........................ 10-2020-0065210 |
| Jun. 1, 2020 | (KR) | ........................ 10-2020-0066074 |
| Jun. 5, 2020 | (KR) | ........................ 10-2020-0068274 |

(51) Int. Cl.
*H04W 72/02* (2009.01)
*H04L 5/00* (2006.01)
(Continued)

(52) U.S. Cl.
CPC ........... *H04W 72/02* (2013.01); *H04L 1/1812* (2013.01); *H04L 5/0051* (2013.01);
(Continued)

(58) Field of Classification Search
CPC ... H04W 72/02; H04W 4/40; H04W 72/0406; H04W 72/0446; H04L 5/0051; H04L 5/0053

See application file for complete search history.

(56) References Cited

U.S. PATENT DOCUMENTS

2019/0191424 A1 6/2019 Wang et al.
2019/0387377 A1* 12/2019 Zhang ................. H04W 84/005
(Continued)

FOREIGN PATENT DOCUMENTS

KR 20190007066 1/2019
WO WO 2020033381 * 2/2020 ............ H04W 74/08
(Continued)

OTHER PUBLICATIONS

3GPP TS 38.214 V16.1.0 , Physical layer procedure for data, publisher on Feb. 2020 (Year: 2020).*
(Continued)

*Primary Examiner* — Diane L Lo
*Assistant Examiner* — Abusayeed M Haque
(74) *Attorney, Agent, or Firm* — Fish & Richardson P.C.

(57) ABSTRACT

Provided are a method for performing wireless communication by a first device and a device supporting same. The method may include: receiving, from a second device, first sidelink control information (SCI) including information related to a resource reservation period, on a slot; determining a size of a selection window based on a remaining packet delay budget; obtaining a value of N by applying a ceiling function to a value obtained by dividing the size of the selection window by the resource reservation period; determining that resources are reserved by the second device on the N slots, after the slot in which the first SCI is received, which are spaced apart by a unit of the resource reservation period; and based on the determination, selecting a resource for SL communication in the selection window, wherein the N is a positive integer.

20 Claims, 23 Drawing Sheets

Related U.S. Application Data

(60) Provisional application No. 63/034,393, filed on Jun. 3, 2020, provisional application No. 63/033,820, filed on Jun. 2, 2020, provisional application No. 63/033,186, filed on Jun. 1, 2020, provisional application No. 63/032,322, filed on May 29, 2020, provisional application No. 63/031,541, filed on May 28, 2020, provisional application No. 63/030,892, filed on May 27, 2020, provisional application No. 63/030,292, filed on May 26, 2020, provisional application No. 63/016,961, filed on Apr. 28, 2020, provisional application No. 63/012,858, filed on Apr. 20, 2020, provisional application No. 63/008,614, filed on Apr. 10, 2020.

(51) Int. Cl.
*H04W 28/26* (2009.01)
*H04L 1/1812* (2023.01)
*H04W 72/0446* (2023.01)
*H04W 4/40* (2018.01)
*H04W 72/20* (2023.01)
*H04W 72/23* (2023.01)

(52) U.S. Cl.
CPC .............. *H04L 5/0053* (2013.01); *H04W 4/40* (2018.02); *H04W 28/26* (2013.01); *H04W 72/0446* (2013.01); *H04W 72/20* (2023.01); *H04W 72/23* (2023.01)

(56) References Cited

U.S. PATENT DOCUMENTS

| | | | | |
|---|---|---|---|---|
| 2020/0314804 | A1* | 10/2020 | Shin | H04W 24/10 |
| 2021/0022142 | A1 | 1/2021 | Wu et al. | |
| 2021/0243796 | A1* | 8/2021 | Panteleev | H04W 8/24 |
| 2021/0289580 | A1* | 9/2021 | Damnjanovic | H04W 76/14 |
| 2021/0320879 | A1* | 10/2021 | Wang | H04L 47/2433 |
| 2022/0191849 | A1* | 6/2022 | Yoon | H04L 5/0078 |
| 2022/0217032 | A1* | 7/2022 | Ko | H04L 5/001 |

FOREIGN PATENT DOCUMENTS

| | | | | |
|---|---|---|---|---|
| WO | WO-2020033381 A1 * | 2/2020 | ............ | H04W 24/08 |
| WO | WO-2021080376 A1 * | 4/2021 | ............ | H04L 5/0051 |
| WO | WO-2021203379 A1 * | 10/2021 | ............ | H04W 72/02 |

OTHER PUBLICATIONS

3GPP TS 38.214 V16.1.0 (Release 16), Physical layer procedure for data, published on Feb. 2020 (Year: 2020).*

3GPP, "3rd Generation Partnership Project; Technical Specification Group Radio Access Network; NR; Physical layer procedures for data (Release 16)," TS 38.214 V16.1.0, Mar. 2020, 152 pages.

Futurewei, "Remaining details on mode-2 resource allocation," R1-2000566, Presented at 3GPP TSG RAN WG1 Meeting #100-e, e-Meeting, Feb. 24-Mar. 6, 2020, 6 pages.

Intel Corporation, "Outcome of email thread [100e-NR-5G_V2X_NRSL-RA_Mode2-02]," R1-2001345, Presented at 3GPP TSG RAN WG1 Meeting #100-E, e-Meeting, Feb. 24-Mar. 6, 2020, 7 pages.

LG Electronics, "Discussion on resource allocation for Mode 2," R1-2000783, Presented at 3GPP TSG RAN WG1 Meeting #100, e-Meeting, Feb. 24-Mar. 6, 2020, 18 pages.

Office Action in U.S. Appl. No. 17/708,569, dated Jun. 13, 2022, 15 pages.

Intel Corporation, "Sidelink enhancements to support V2V traffic with smaller periodicity," R1-1609462, Presented at 3GPP TSG RAN WG1 Meeting #86bis, Lisbon, Portugal, Oct. 10-14, 2016, 3 pages.

Office Action in Korean Appln. No. 10-2022-7029343, dated Dec. 16, 2022, 7 pages.

Vivo, "Discussion on mode 2 resource allocation mechanism," R1-1911420, Presented at 3GPP TSG RAN WG1 #98bis meeting, Chongqing, China, Oct. 14-20, 2019, 14 pages.

* cited by examiner

FIG. 11
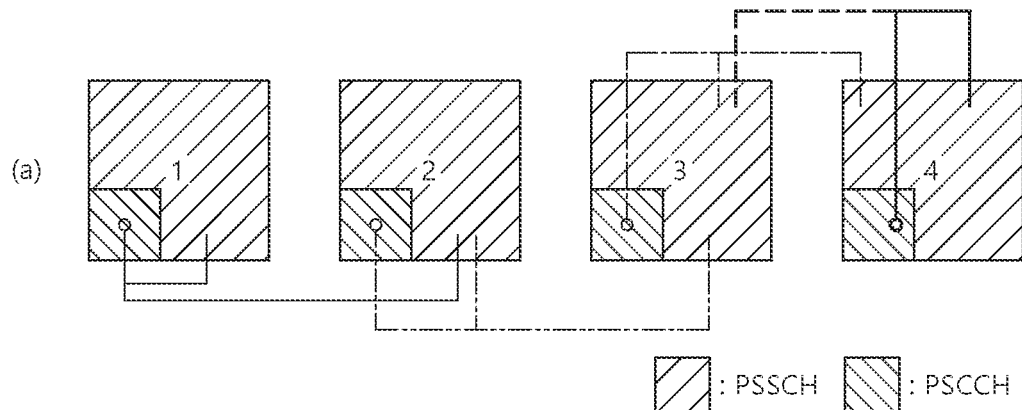
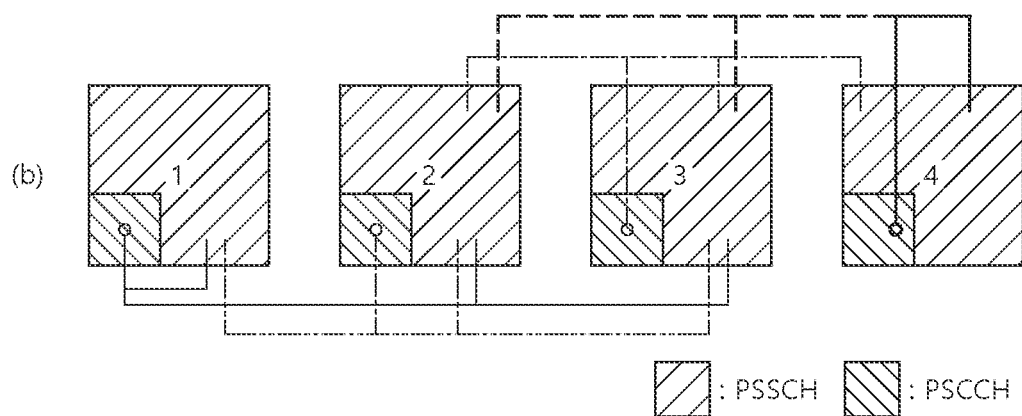
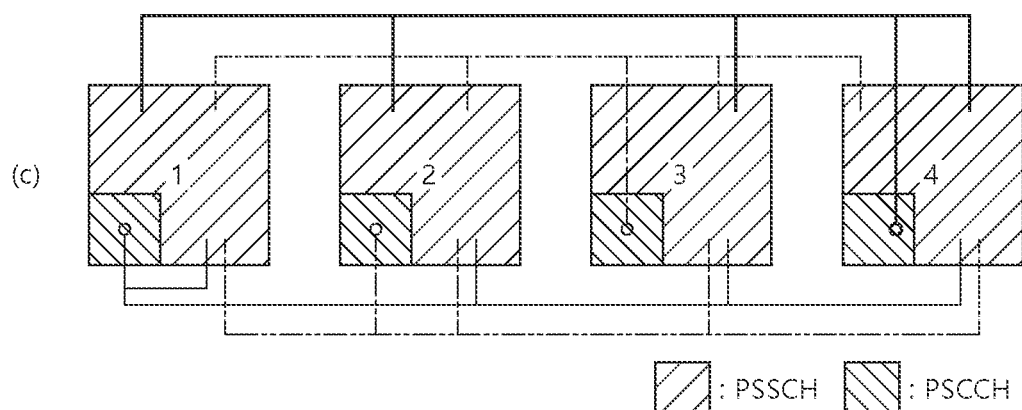

METHOD AND DEVICE FOR RESERVING RESOURCE IN NR V2X

CROSS-REFERENCE TO RELATED APPLICATIONS

Pursuant to 35 U.S.C. § 119(e), this application is a continuation of International Application No. PCT/KR2021/004572, with an international filing date of Apr. 12, 2021, which claims the benefit of U.S. Provisional Patent Application No. 63/008,614, filed on Apr. 10, 2020, U.S. Provisional Patent Application No. 63/012,858, filed on Apr. 20, 2020, U.S. Provisional Patent Application No. 63/016,961, filed on Apr. 28, 2020, U.S. Provisional Patent Application No. 63/030,292, filed on May 26, 2020, U.S. Provisional Patent Application No. 63/030,892, filed on May 27, 2020, U.S. Provisional Patent Application No. 63/031,541, filed on May 28, 2020, U.S. Provisional Patent Application No. 63/032,322, filed on May 29, 2020, U.S. Provisional Patent Application No. 63/033,186, filed on Jun. 1, 2020, U.S. Provisional Patent Application No. 63/033,820, filed on Jun. 2, 2020, U.S. Provisional Patent Application No. 63/034,393, filed on Jun. 3, 2020, Korean Patent Application No. 10-2020-0065210, filed on May 29, 2020, Korean Patent Application No. 10-2020-0066074, filed on Jun. 1, 2020 and Korean Patent Application No. 10-2020-0068274, filed on Jun. 5, 2020, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-o-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

Meanwhile, according to the prior art, when a transmitting UE receives sidelink control information (SCI) from another UE based on the first resource, the transmitting UE may determine that CEILING (100 [ms]/P) resources are selected/reserved by the UE that transmitted the SCI, TX UE may not select CEILING (100 [ms]/P) resources. Here, Y=CEILING (X) may be a function for deriving a minimum integer among integers greater than or equal to X, and P may be a resource reservation period in ms. That is, according to the prior art, the UE may exclude unnecessary resources from selection in a 100 ms interval. Therefore, there is a need to propose an efficient resource exclusion operation of the UE. Furthermore, a UE operation according to the type of the SCI needs to be defined.

Meanwhile, when a plurality of resource pools are configured for a UE, sizes of SL downlink control information (DCI) related with a plurality of resource pools may be different. In this case, when the UE performs blind decoding on SL DCI related with each of the plurality of resource pools, the complexity of the UE may increase. Accordingly, there is a need to propose a method for not increasing the complexity of the UE due to blind decoding for a plurality of SL DCIs.

Technical Solutions

In one embodiment, provided is a method for performing wireless communication by a first device. The method may comprise: receiving first sidelink control information (SCI) including information related to a resource reservation period, on a slot from a second device; determining a size of a selection window based on a remaining packet delay budget; obtaining a value of N by applying a CEILING function to a value obtained by dividing the size of the selection window by the resource reservation period; determining that resources are reserved by the second device, on N slots spaced apart by a unit of the resource reservation period, after the slot in which the first SCI is received; and selecting a resource for SL communication within the selection window, based on the determination. The N may be a positive integer.

In one embodiment, provided is a first device configured to perform wireless communication. The first device may comprise one or more memories storing instructions; one or more transceivers; and one or more processors connected to the one or more memories and the one or more transceivers. The one or more processors may execute the instructions to: receive first sidelink control information (SCI) including information related to a resource reservation period, on a slot from a second device; determine a size of a selection window based on a remaining packet delay budget; obtain a value of N by applying a CEILING function to a value obtained by dividing the size of the selection window by the resource reservation period; determine that resources are reserved by the second device, on N slots spaced apart by a unit of the resource reservation period, after the slot in which the first SCI is received; and select a resource for SL communication within the selection window, based on the determination. The N may be a positive integer.

Effects of the Disclosure

The UE can efficiently perform SL communication.

BRIEF DESCRIPTION OF THE DRAWINGS

FIG. 11 shows a method in which a UE that has reserved transmission resource(s) informs another UE of the transmission resource(s), based on an embodiment of the present disclosure.

DESCRIPTION OF EXEMPLARY EMBODIMENTS

Figure 1:
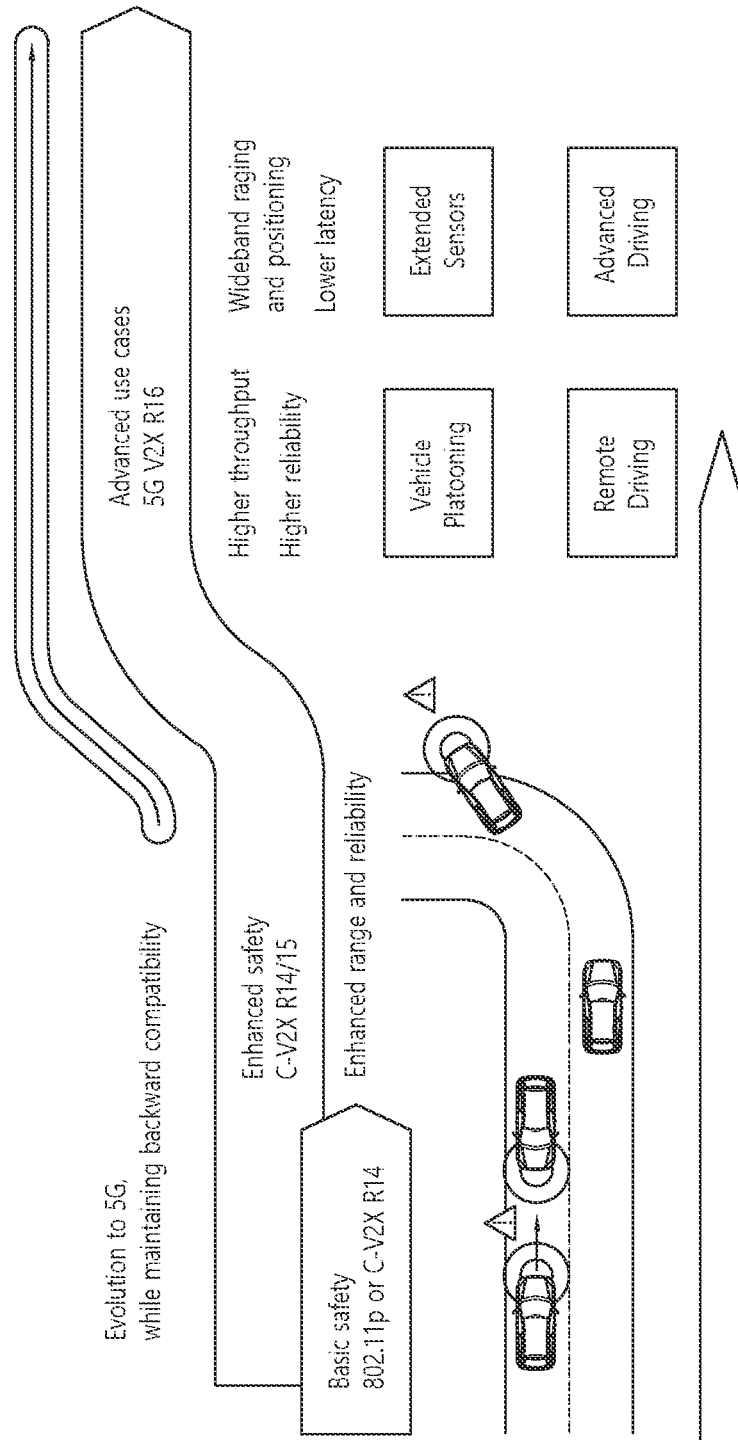
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
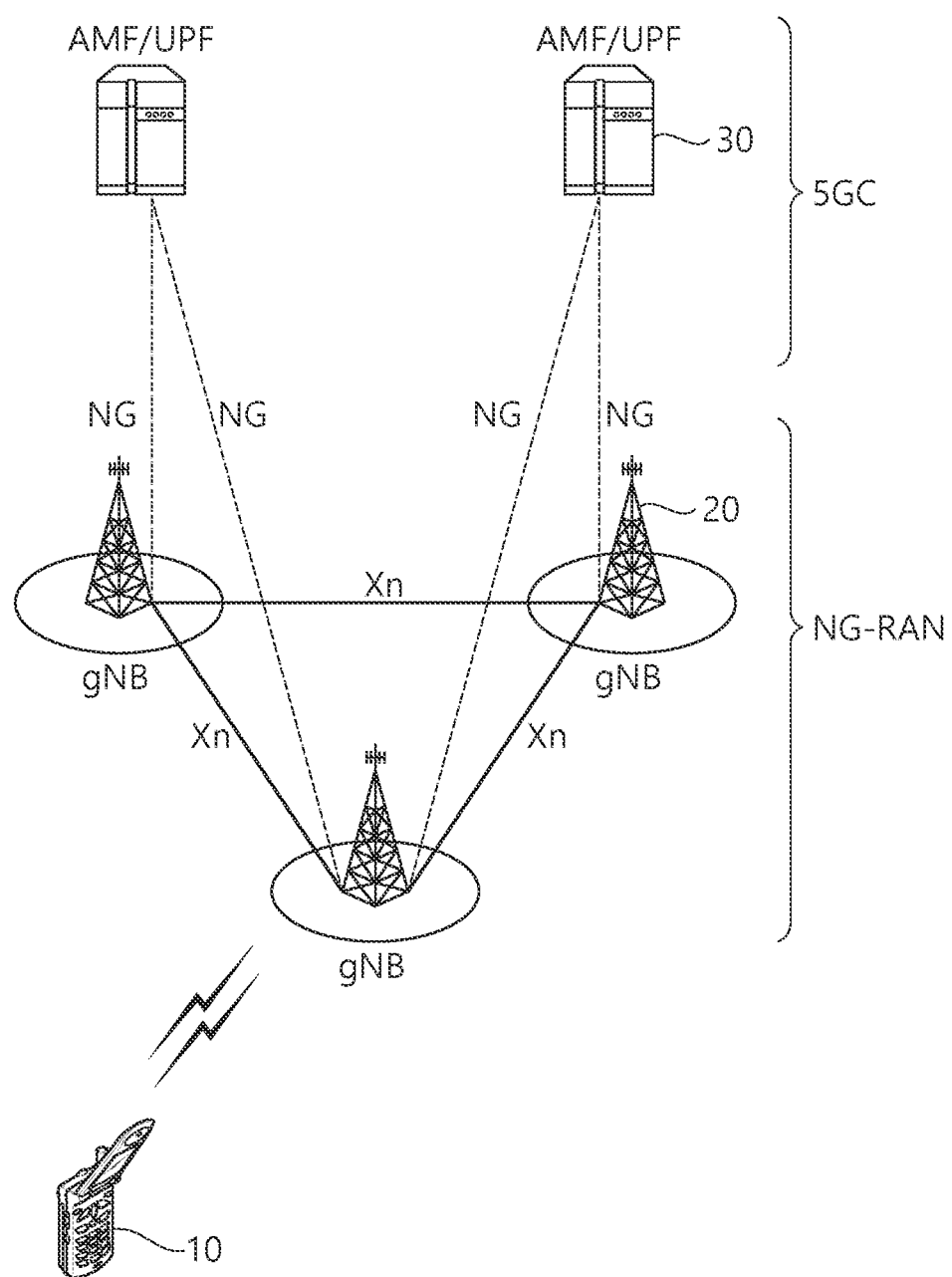
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
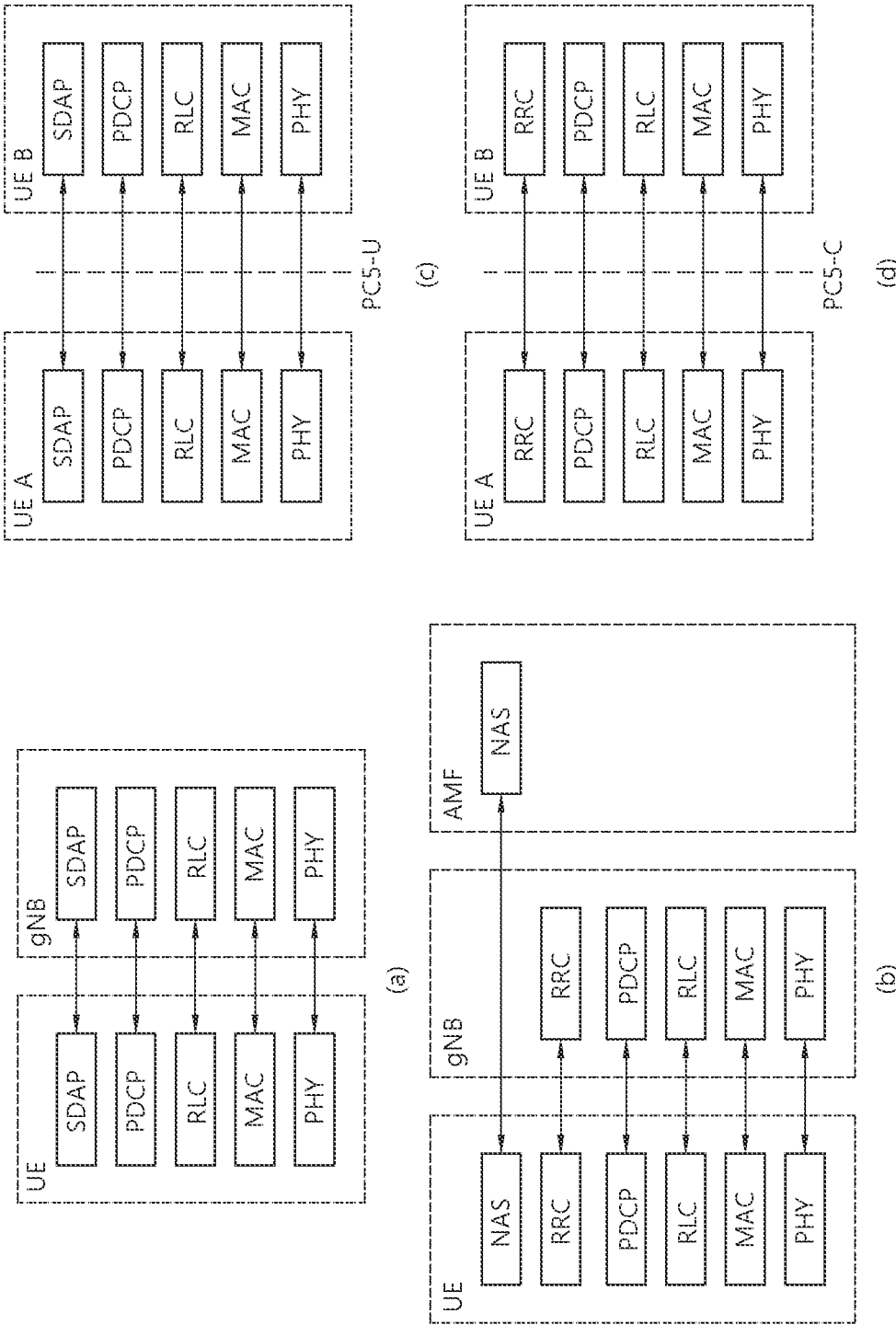
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
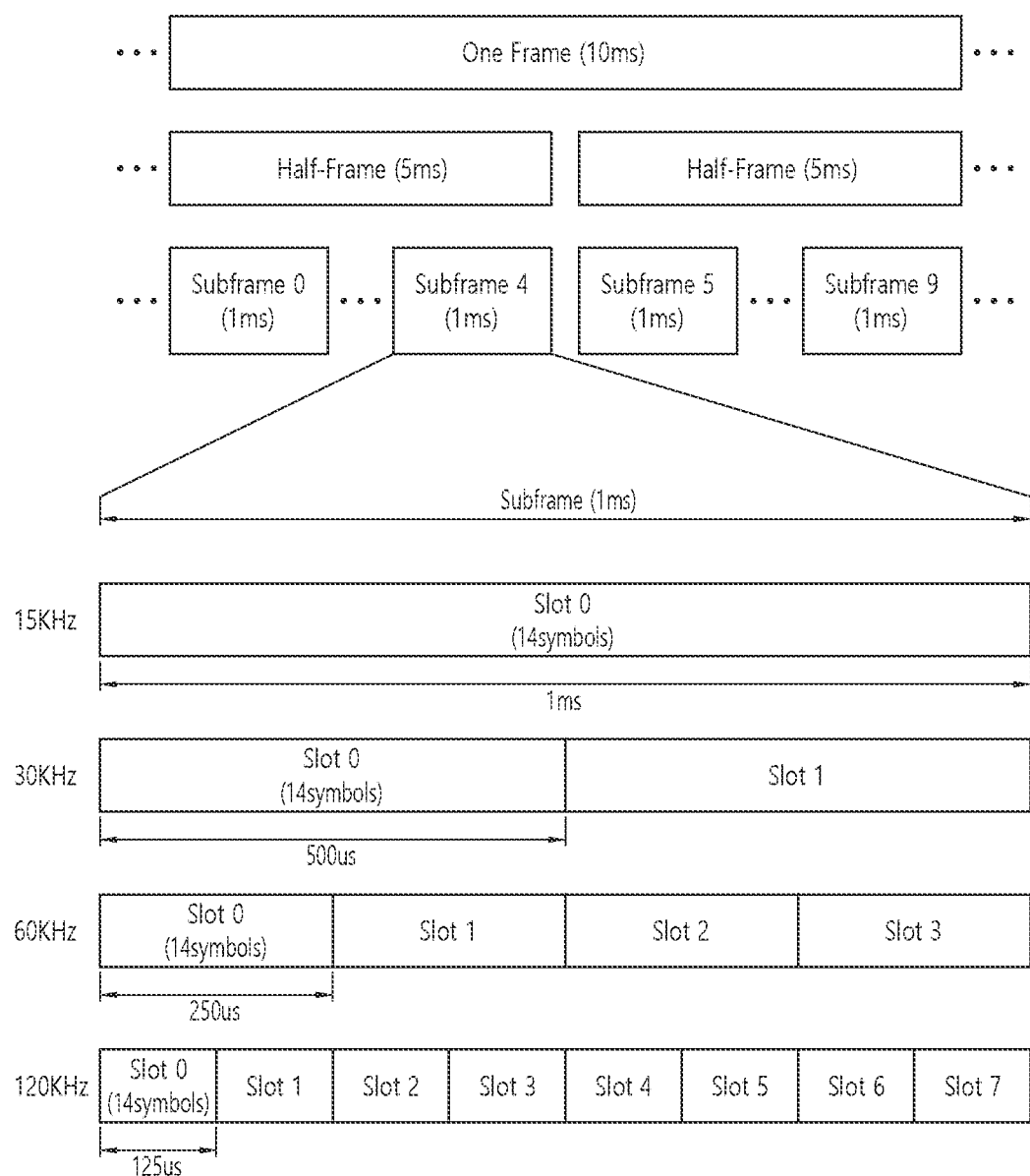
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
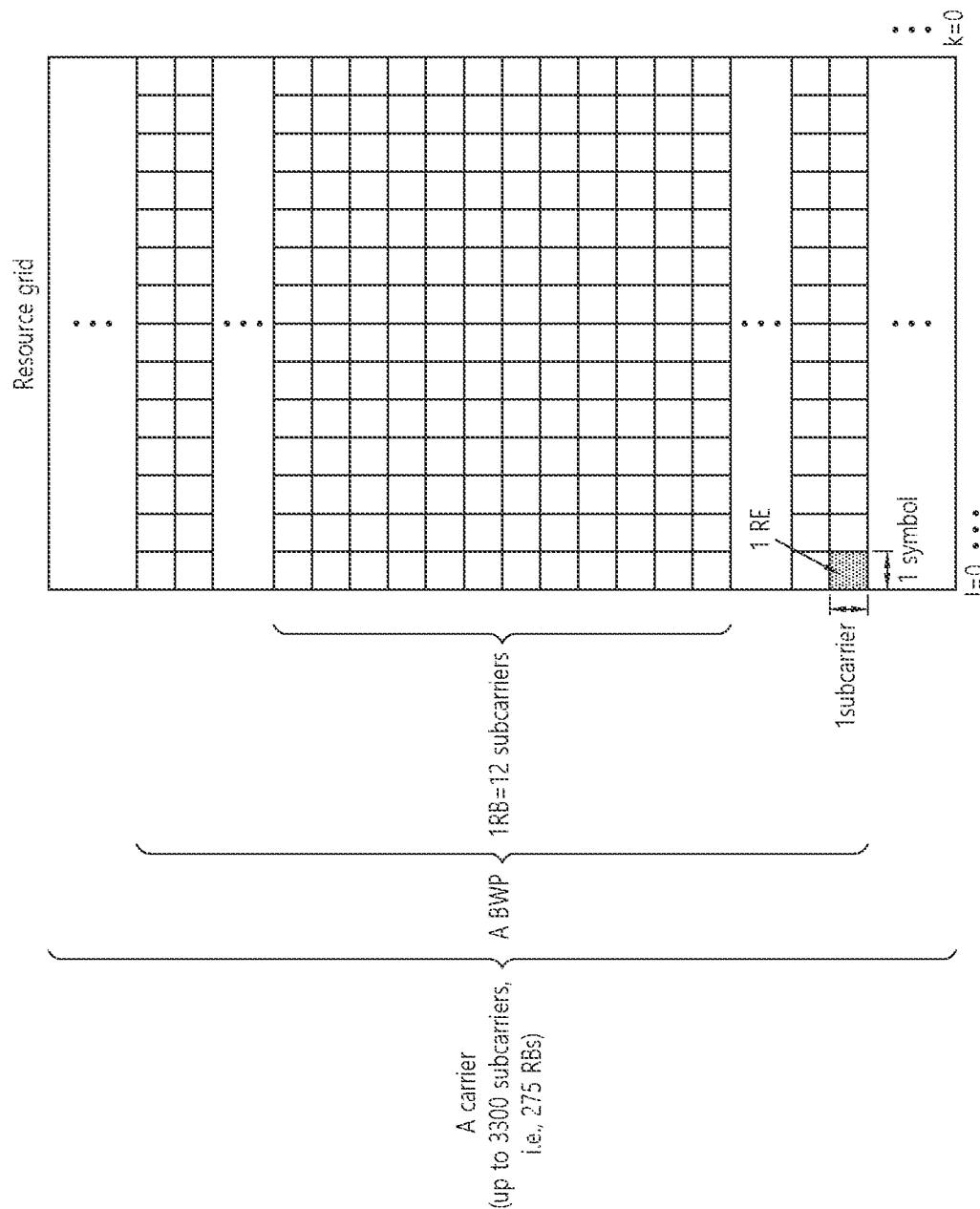
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
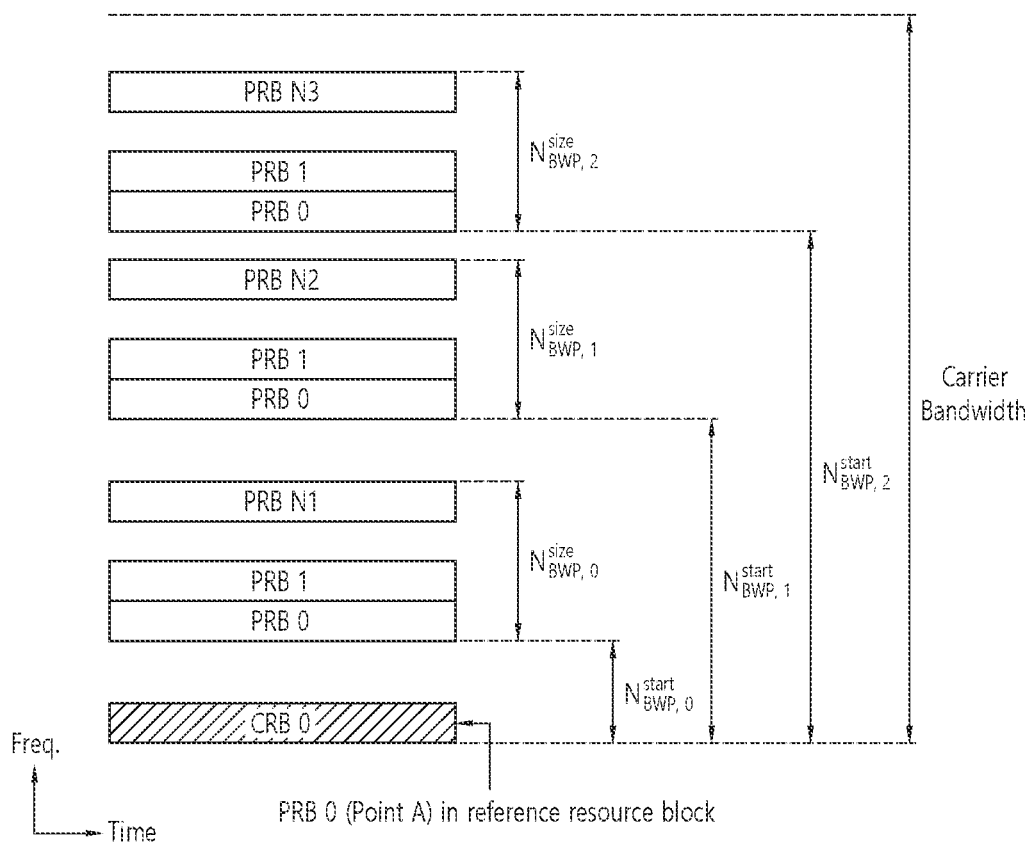
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
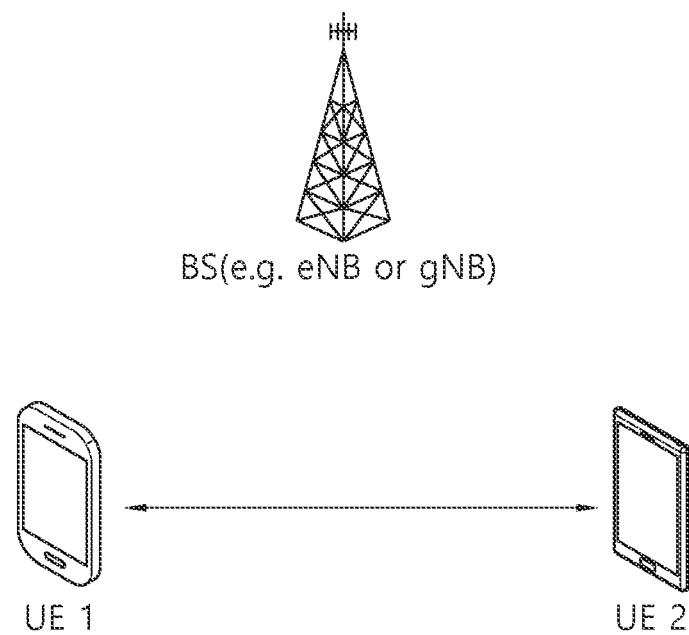
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
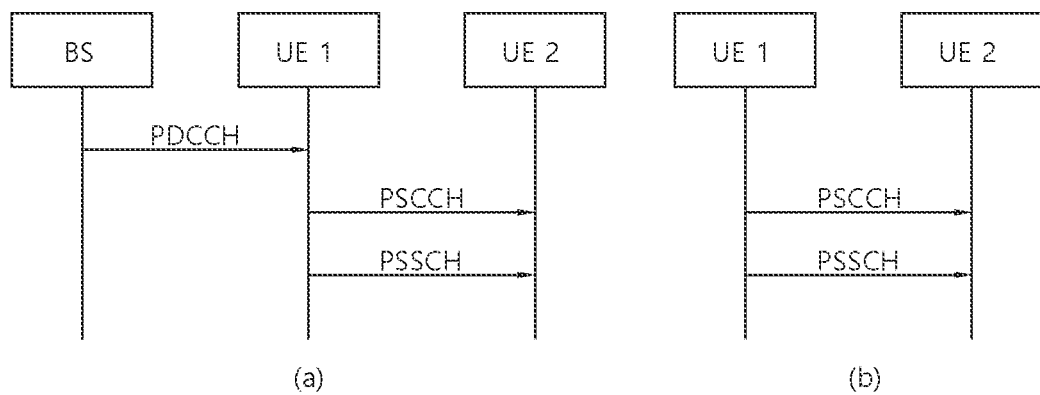
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
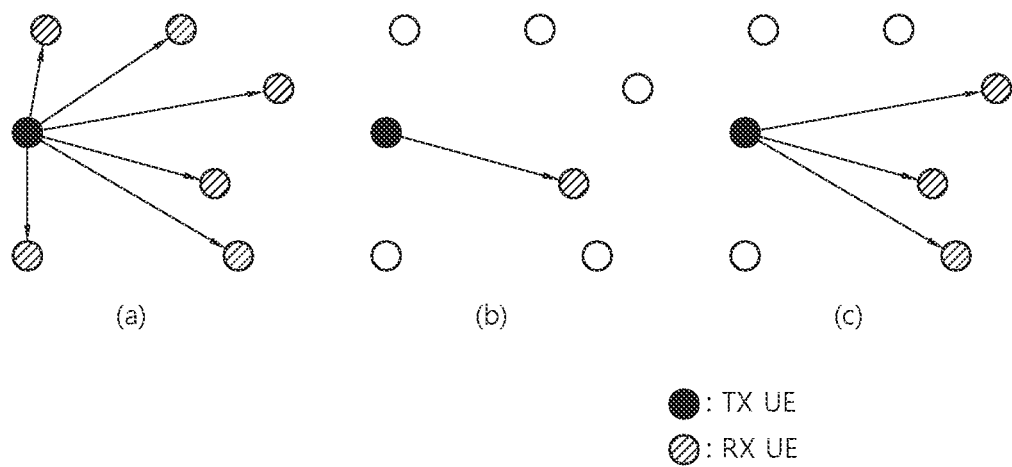
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
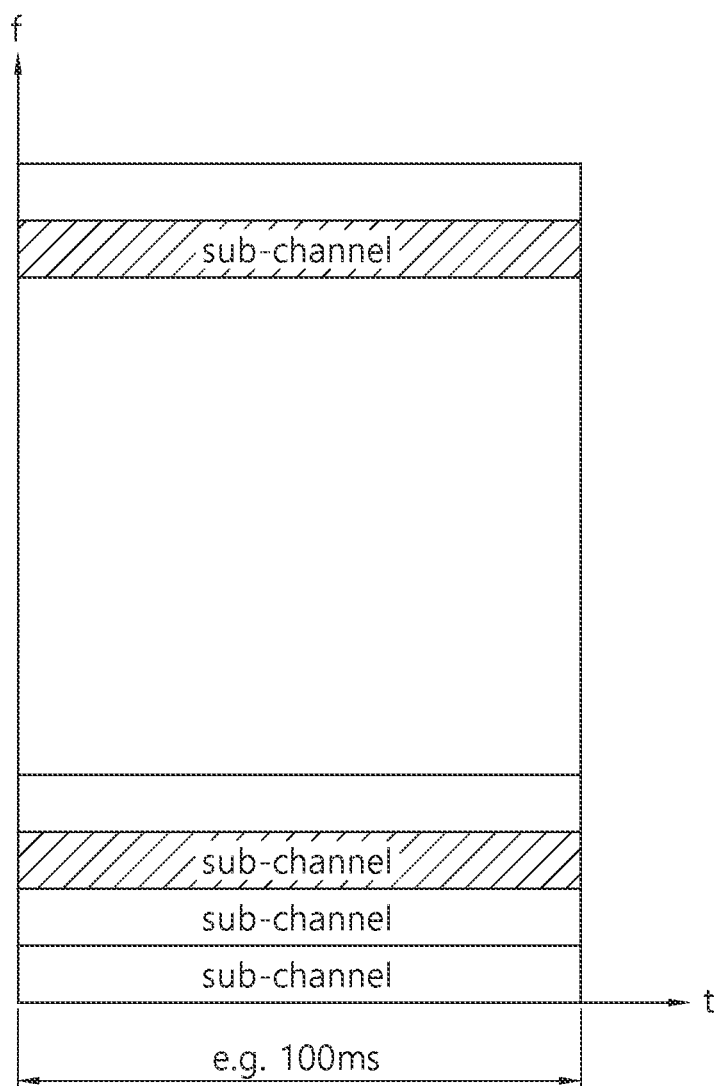
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or Reference Signal Received Power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, a transmitting UE (i.e., TX UE) may be a UE which transmits data to a (target) receiving UE (i.e., RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal(s) (DM-RS(s))) and/or a SL (L1) RSRP report request indicator to be used for SL (L1) RSRP measurement to the (target) RX UE(s). For example, the TX UE may be a UE which transmits (control) channel(s) (e.g., PSCCH, PSSCH, etc.) and/or reference signal(s) (e.g., DM-RS(s), CSI-RS(s), etc.) on the (control) channel(s) to be used for a SL radio link monitoring (RLM) operation and/or a SL radio link failure (RLF) operation of the (target) RX UE.

Meanwhile, in the present disclosure, a receiving UE (i.e., RX UE) may be a UE which transmits SL HARQ feedback to a transmitting UE (i.e., TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE may be a UE which transmits, to the TX UE, a SL (L1) RSRP measurement value measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, a TX UE may transmit the entirety or part of information described below to the RX UE through SCI(s). Herein, for example, the TX UE may transmit the entirety or part of the information described below to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator)) (on a PSSCH)

Modulation and coding scheme (MCS) information

Transmit power information

L1 destination ID information and/or L1 source ID information

SL HARQ process ID information

New data indicator (NDI) information

Redundancy version (RV) information (Transmission traffic/packet related) QoS information (e.g., priority information)

SL CSI-RS transmission indicator or information on the number of antenna ports for (transmitted) SL CSI-RS Location information of the TX UE or location (or distance region) information of the target RX UE (for which SL HARQ feedback is requested)

Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in the present disclosure, for example, a PSCCH may be replaced/substituted with at least one of a SCI, a first SCI ($1^{st}$-stage SCI), and/or a second SCI ($2^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa.

Meanwhile, in the present disclosure, for example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the Pt SCI and the $2^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

Meanwhile, in the present disclosure, for example, "configure/configured" or "define/defined" may refer to being (pre-)configured from a base station or a network. For example, "configure/configured" or "define/defined" may refer to being (pre-)configured for each resource pool from the base station or the network. For example, the base station or the network may transmit information related to "configuration" or "definition" to the UE. For example, the base station or the network may transmit information related to "configuration" or "definition" to the UE through predefined signaling. For example, the pre-defined signaling may include at least one of RRC signaling, MAC signaling, PHY signaling, and/or SIB.

Meanwhile, in the present disclosure, for example, "configure/configured" or "define/defined" may refer to being designated or configured through pre-configured signaling between UEs. For example, information related to "configuration" or "definition" may be transmitted or received pre-configured signaling between UEs. For example, the pre-defined signaling may include at least one of RRC signaling, MAC signaling, PHY signaling, and/or SIB.

Meanwhile, in the present disclosure, for example, RLF may be replaced/substituted with out-of-synch (OOS) and/or in-synch (IS), or vice versa.

Meanwhile, in the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa. For example, the cast or the cast type may include unicast, groupcast and/or broadcast.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in the present disclosure, a high priority may mean a small priority value, and a low priority may mean a large priority value. For example, Table 5 shows an example of priorities.

TABLE 5

| service or logical channel | priority value |
| --- | --- |
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 11 shows a method in which a UE that has reserved transmission resource(s) informs another UE of the transmission resource(s), based on an embodiment of the present disclosure. The embodiment of FIG. 11 may be combined with various embodiments of the present disclosure.

Specifically, for example, (a) of FIG. 11 shows a method for performing by a transmitting UE chain-based resource reservation by transmitting/signaling location information of (maximum) 2 transmission resources to receiving UE(s) through one SCI, in the case of a value of K=4. For example, (b) of FIG. 11 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 11, the transmitting UE may transmit/signal only location information of the fourth transmission-related resource to the receiving UE(s) through the fourth (or last) transmission-related PSCCH. For example, referring to (a) of FIG. 11, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 11, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 11, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 11, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 11 shows a method for performing by the transmitting UE block-based resource reservation, by signaling location information of 4 transmission resources to receiving UE(s) through one SCI, in the case of a value of K=4.

Based on an embodiment of the present disclosure, the base station/network may configure or pre-configure the UE so that the following (part of) parameters are maintained the same between a plurality of (reserved) transmission resources related to a specific TB. Here, for example, the UE may maintain/configure the following (part of) parameters the same between a plurality of (reserved) transmission resources related to a specific TB. For example, the base station/network may configure or pre-configure the UE so that the following (part of) parameters are maintained the same between transmission resources scheduled/reserved by (one) SCI. Here, for example, the UE may maintain/configure the following (part or) parameters the same between transmission resources scheduled/reserved by (one) SCI. For example, the parameter may include at least one of (i) MCS value, (ii) RV value, (iii) NDI value, and/or (iv) a number of REs related to the mapping of the second SCI and/or a parameter (for example, beta offset) for determining (effective) coding rate.

Here, for example, whether the corresponding rule is applied or whether the corresponding rule is enabled may be differently (or limitedly) configured for the UE, according to the resource pool. For example, whether the corresponding rule is applied or whether the corresponding rule is enabled may be differently (or limitedly) configured for the UE, according to the service type. For example, whether the corresponding rule is applied or whether the corresponding rule is enabled may be differently (or limitedly) configured for the UE, according to the service priority. For example, whether the corresponding rule is applied or whether the corresponding rule is enabled may be differently (or limitedly) configured for the UE, according to QoS requirements (for example, delay, reliability). For example, whether the corresponding rule is applied or whether the corresponding rule is enabled may be differently (or limitedly) configured for the UE, according to the cast type (for example, unicast, groupcast, broadcast). For example, whether the corresponding rule is applied or whether the corresponding rule is enabled may be differently (or limitedly) configured for the UE, according to the HARQ feedback option (for example, (TX-RX distance-based) NACK ONLY feedback, ACK/

NACK feedback). For example, whether the corresponding rule is applied or whether the corresponding rule is enabled may be differently (or limitedly) configured for the UE, according to a HARQ (feedback) ENABLED TB or a HARQ (feedback) DISABLED TB. For example, whether the corresponding rule is applied or whether the corresponding rule is enabled may be differently (or limitedly) configured for the UE, according to the (resource pool-related) congestion level. For example, whether the corresponding rule is applied or whether the corresponding rule is enabled may be differently (or limitedly) configured for the UE, according to a periodic resource reservation method (based on a backward indication) or a chain-based resource reservation method (without a backward indication). For example, whether the corresponding rule is applied or whether the corresponding rule is enabled may be differently (or limitedly) configured for the UE according to the number (for example, 2) of the maximum transmission resources that can be signaled by (pre-configured) SCI, For example, when the above rule is applied, the RX UE may be configured to perform HARQ combining of PSSCH on related scheduling/reservation resources or data. Specifically, for example, when the above rules apply, even if the RX UE, which succeeds in decoding SCI, fails (partially) in decoding of each associated (additional) SCI, it may be configured to enable HARQ combining of PSSCH on the scheduling/reservation resource related to the SCI or data.

For example, when the size of the frequency resource of a specific subchannel constituting the resource pool is larger or smaller than that of the other subchannels, it may be, exceptionally, configured such that the above-described proposed rule is not applied. For the convenience of explanation, when a size of the frequency resource of a specific subchannel constituting the resource pool is larger or smaller than that of the other subchannels, the subchannel may be referred to as UNNOR_SB. For example, when UNNOR_SB is included in a plurality of (reserved) transmission resources related to a specific TB, it may be, exceptionally, configured such that the above-described proposed rule is not applied. For example, when UNNOR_SB is included in the transmission resource scheduled/reserved by (one) SCI, it may be, exceptionally, configured such that the above-described proposed rule is not applied. Through this, for example, even though UNNOR_SB is included in a plurality of (reserved) transmission resources related to a specific TB, the UE may maintain the TB size the same. In addition, for example, even though UNNOR_SB is included in a transmission resource scheduled/reserved by (one) SCI, the UE may maintain the TB size the same.

For example, between specific TB-related (reserved) transmission resources where chain-based signaling is stopped, exceptionally, it may be configured such that the above-described proposed rule is not applied. For example, between (re)transmission resources after HARQ feedback (for example, NACK) (via PSFCH) and (re)transmission resources before the HARQ feedback, exceptionally, it may be configured such that the above-described proposed rule is not applied. For example, between the (re)transmission resources after the time point when DTX occurs (for example, the situation in which the RX UE does not perform PSFCH transmission due to PSCCH decoding failure) and the (re)transmission resources before the time point when DTX occurs, exceptionally, it may be configured such that the above-described proposed rule is not applied.

Based on an embodiment of the present disclosure, the numerology related to the bitmap for the resource pool (for example, bitmap applied to resource pool) and/or the granularity to which the bitmap for the resource pool is applied may be configured the same as the (reference) numerology related to the TDD configuration on the PSBCH. For example, the numerology related to the bitmap for the resource pool and/or the granularity to which the bitmap for the resource pool is applied may be configured the same as the (reference) numerology related to the signaling of the number of UL slots on the PSBCH. For example, the numerology related to the bitmap for the resource pool and/or the granularity to which the bitmap for the resource pool is applied may be configured the same as the (reference) numerology of the UL (related to Uu communication). For example, the numerology related to the bitmap for the resource pool and/or the granularity to which the bitmap for the resource pool is applied may be configured the same as the (reference) numerology of the DL (related to Uu communication). For example, the numerology may include subcarrier spacing, CP length, CP type, and the like.

For example, the numerology related to the bitmap for the resource pool and/or the granularity to which the bitmap for the resource pool is applied may be configured differently from the (reference) numerology related to the TDD configuration on the PSBCH. For example, the numerology related to the bitmap for the resource pool and/or the granularity to which the bitmap for the resource pool is applied may be configured differently from the (reference) numerology related to the signaling of the number of UL slots on the PSBCH. For example, the numerology related to the bitmap for the resource pool and/or the granularity to which the bitmap for the resource pool is applied may be configured differently from the (reference) numerology of the UL (related to Uu communication). For example, the numerology related to the bitmap for the resource pool and/or the granularity to which the bitmap for the resource pool is applied may be configured differently from the (reference) numerology of the DL (related to Uu communication). For example, the numerology may include subcarrier spacing, CP length, CP type, and the like.

Based on an embodiment of the present disclosure, when the number of RBs included in one subchannel is configured to be equal to the number of PSCCH RBs, the base station/network may not configure (specifically in the resource pool) the pattern of the PSSCH DMRS and/or the number of PSSCH DMRSs having a problem in the mapping of the second SCI to the UE. For example, when the number of RBs included in one subchannel is configured to be equal to the number of PSCCH RBs, the UE may expect/determine that the base station/network does not configure (specifically in the resource pool) the pattern of PSSCH DMRS and/or the number of PSSCH DMRSs having a problem in the mapping of the second SCI to the UE. For example, the pattern of the PSSCH DMRS and/or the number of PSSCH DMRSs may be parameters related to the time-domain of the DMRS mapped on the PSSCH resource. For example, when the number of RBs included in one subchannel is configured to be equal to the number of PSCCH RBs, even though the base station/network configures (specifically in the resource pool) the candidate pattern of PSSCH DMRS and/or the candidate number of PSSCH DMRSs having a problem in the mapping of the second SCI to the UE, the UE may not select/use the candidate pattern of PSSCH DMRS and/or the candidate number of PSSCH DMRSs having a problem in the mapping of the second SCI. Here, for example, the UE may be configured to (basically) map the PSSCH-related first (for example, including REs except for DMRS REs) DMRS symbol (hereinafter, FRT_DMSYM) to the second SCI in the form of frequency first & time second. For example, after sequentially mapping the second SCI on #(FRT_DMSYM), the UE may map the second SCI on #(FRT_DMSYM+1). Thereafter, based on the same rule, the UE may map the second SCI on #(FRT_DMSYM+N). Here, N may be a positive integer.

For example, when the UE performs mapping the second SCI based on the pattern of PSSCH DMRS and/or the number of PSSCH DMRS, if FRT_DMSYM is truncated (all or part) by the PSCCH RB, the PSSCH DMRS pattern and/or the number of PSSCH DMRSs may be determined/considered to be the PSSCH DMRS pattern and/or the number of PSSCH DMRSs having a problem in the mapping of the second SCI. For example, when the UE performs mapping the second SCI based on the pattern of PSSCH DMRS and/or the number of PSSCH DMRS, if the PSSCH DMRS (the earliest in the time domain), that is not truncated (all or part) by the PSCCH RB, exists after the pre-configured threshold position within the PSSCH duration, the PSSCH DMRS pattern and/or the number of PSSCH DMRSs may be determined/considered to be the PSSCH DMRS pattern and/or the number of PSSCH DMRSs having a problem in the mapping of the second SCI. For example, when the UE performs mapping the second SCI based on the pattern of PSSCH DMRS and/or the number of PSSCH DMRS, if the number of (or remaining) PSSCH DMRS used for decoding of the second SCI is less than a pre-configured threshold, the PSSCH DMRS pattern and/or the number of PSSCH DMRSs may be determined/considered to be the PSSCH DMRS pattern and/or the number of PSSCH DMRSs having a problem in the mapping of the second SCI.

For example, the proposed rule may be (limitedly) applied only when TB transmission is performed through one subchannel. Here, for example, in this case, the UE may be configured to map the second SCI in the reverse direction from the last symbol related to the PSSCH. For example, in this case, the UE may be configured to map the second SCI in the reverse direction from the last symbol related to the PSSCH in the form of frequency first & time second. For example, the last symbol may be the last DMRS symbol or the last data symbol.

Based on an embodiment of the present disclosure, when the TX UE uses resources on a PSFCH slot (for example, a slot that includes a PSFCH resource) and a NON-PSFCH slot (for example, a slot that does not include a PSFCH resource), if the TX UE cannot keep the same (PSSCH) TB size between the initial transmission and the retransmission, the TX UE may be configured to perform transmission resource selection/reservation (related to a specific TB) using only resources on a slot (for example, a PSFCH slot or a NON-PSFCH slot) of the same type/characteristics. For example, after the TX UE selects a specific TB-related transmission resource, if the TX UE cannot maintain the same (PSSCH) TB size between initial transmission and retransmission due to the overhead of PSFCH resources, the TX UE may be configured to trigger/perform transmission resource reselection.

Based on an embodiment of the present disclosure, even if the number of PSFCHs required for simultaneous transmission is less than the capability of the UE, the sum of the required transmission power of the PSFCH may be greater than the maximum transmission power of the UE. For the convenience of explanation, a case in which the sum of the required transmission power of the PSFCH is greater than the maximum transmission power of the UE may be referred to as a power-limited case. For example, in a power-limited case, the UE may assume/determine at least one of PSFCH including NACK (or ACK) information, (in groupcast) NACK ONLY feedback scheme related PSFCH (for example, PSFCH including NACK information), and/or groupcast (or unicast) related PSFCH as (relatively) high-priority PSFCH transmission. For example, in a power-limited case, the UE may assume/determine at least one of PSFCH including ACK (or NACK) information, (in groupcast) ACK/NACK feedback scheme related PSFCH, and/or unicast (or groupcast) related PSFCH as (relatively) low-priority PSFCH transmission. For example, until getting out the power-limiting case, the UE may omit (relatively) low-priority PSFCH transmission. Here, for example, in the power-limited case for PSFCH transmissions of the same priority, the UE may omit a specific PSFCH transmission from among the PSFCH transmissions of the same priority. In this case, the specific PSFCH transmission may be determined by UE implementation.

Based on an embodiment of the present disclosure, a method for in-device coexistence of NR/LTE SL is proposed. For example, when the first SL communication and the second SL communication become TDM, an interruption time or a switching time generated by switching between the first SL communication and the second SL communication may be configured in an SL region having a relatively low priority. For example, when the first SL communication and the second SL communication become TDM, an interruption time or a switching time generated by switching between the first SL communication and the second SL communication may be configured in a (TB) retransmission-related SL area. For example, when the first SL communication and the second SL communication become TDM, an interruption time or a switching time generated by switching between the first SL communication and the second SL communication may be configured in the SL region of a (relatively) large numerology. For example, when the first SL communication and the second SL communication become TDM, an interruption time or a switching time generated by switching between the first SL communication and the second SL communication may be configured in the SL region of a (relatively) small numerology. For example, when the first SL communication and the second SL communication become TDM, an interruption time or a switching time generated by switching between the first SL communication and the second SL communication may be configured in an SL region with a (relatively) small number of slots (partially) overlapping the required interruption time or switching time. For example, the numerology may include subcarrier spacing, CP length, CP type, and the like. For example, the switching between the first SL communication and the second SL communication may include switching from the first SL communication to the second SL communication. For example, the switching between the first SL communication and the second SL communication may include switching from the second SL communication to the first SL communication. For example, the interruption time or the switching time may be a time at which an operation related to SL transmission and/or SL reception is interrupted. For example, the first SL communication may be NR-based SL transmission, and the second SL communication may be LTE-based SL transmission. For example, the first SL communication may be NR-based SL transmission, and the second SL communication may be LTE-based SL reception. For example, the first SL communication may be NR-based SL reception, and the second SL communication may be LTE-based SL transmission. For example, the first SL communication may be NR-based SL reception, and the second SL communication may be LTE-based SL reception.

Based on an embodiment of the present disclosure, the UE may expect/determine that the resource pool is (limitedly) specified so that the difference in frequency resource size between subchannels constituting the resource pool is less than or equal to a pre-configured threshold. For example, the base station/network may configure the resource pool to the UE (limitedly) so that the difference in frequency resource size between subchannels constituting the resource pool is less than or equal to a pre-configured threshold. In addition, for example, when the transmission resource is configured on N slots, the UE may determine the related TB size based on the frequency size of the transmission resource on the slot that does not include UNNOR_SB. For example, when the transmission resource is configured on N slots, the UE may determine the related TB size based on the frequency size of the transmission resource on the slot that includes UNNOR_SB. For example, when the transmission resource is configured on N slots, the UE may determine the related TB size based on the (smallest) frequency size among the frequency sizes of transmission resources on the N slots. For example, when the transmission resource is configured on N slots, the UE may determine the related TB size based on the (largest) frequency size among the frequency sizes of the transmission resources on the N slots. For example, when the transmission resource is configured on N slots, the UE may determine the related TB size based on the average of the frequency sizes of transmission resources on the N slots. Here, for example, all of the transmission resources on the N slots may be (limitedly) selected with the same number of subchannels.

Based on an embodiment of the present disclosure, within the CR evaluation (time) window, among the SL grant-related reservation (transmission) resources belonging to the future window, the UE may be configured to (CR) count differently the resources (hereinafter, the first resource) not used by the UE due to receiving ACK information (from the RX UE) and the resources (hereinafter, the second resource) not used by the UE due to the preemption operation. For example, the UE may calculate/obtain a CR value by treating/considering the first resource and the second resource differently. For example, when the resource related to the transmission of the (relatively) high-priority packet (higher than or equal to a pre-configured threshold) and the transmission resource of the TX UE for the transmission of the (relatively) low-priority packet (lower than or equal to a pre-configured threshold) are overlapped, the preemption operation may be an operation in which the UE reselects a transmission resource for transmission of a (corresponding) low-priority packet. For example, the UE may be configured not to (CR) count the first resource, the UE may be configured to (CR) count the second resource. For example, the UE may be configured to (CR) count the first resource, and the UE may be configured not to (CR) count the second resource. For example, the UE may be configured to (CR) count the first resource, and the UE may be configured to (CR) count the second resource. For example, the UE may be configured not to (CR) count the first resource, and the UE may be configured not to (CR) count the second resource. For example, the UE may be configured not to (CR) count (existing) resources that are not used as preemption, the UE may be configured to (CR) count based on the reselected (replaced) resource. For example, in the case of an operation related to the second resource, in particular, when the SL grant-related reservation (transmission) resource is (partly) preempted, it may be effective under a situation in which all resources related to the SL grant are reselected and/or a situation in which a resource replacing the preempted resource is reselected.

Based on an embodiment of the present disclosure, the base station may perform cross-RAT scheduling for the UE. For example, the NR base station (for example, gNB) may perform cross-rat scheduling of the LTE mode 3 SL SPS for the UE. Here, for example, when the UE performs LTE SL transmission on an LTE licensed carrier, and/or when the LTE modem (or UE) is located within the coverage of the LTE base station (for example, eNB) (on the LTE licensed carrier) (for example, in-coverage state), the UE may perform power control related to LTE SL transmission based on a downlink pathloss between the LTE base station and the LTE modem (or UE). For example, when the UE performs LTE SL transmission on an intelligent transport system (ITS) dedicated carrier (for example, a carrier in which an eNB does not exist), and/or LTE modem (or UE) is located outside the coverage of the LTE base station (on the LTE licensed carrier) (for example, out-of-coverage state), the UE may perform power control related to LTE SL transmission based on the downlink path loss between the NR base station and the NR modem (or UE). For example, when the UE performs LTE SL transmission on an ITS dedicated carrier, and/or when the LTE modem (or UE) is located outside the coverage of the LTE base station (on the LTE licensed carrier), the UE may perform power control related to LTE SL transmission without considering downlink path loss between the base station and the UE.

For example, the LTE base station may perform cross-rat scheduling of SL CG (Type 1) for NR mode 1 for the UE. Here, for example, when the UE performs NR SL transmission on an NR licensed carrier, and/or when the NR modem (or UE) is located within the coverage of the NR base station (on the NR licensed carrier) (for example, in-coverage situation), the UE may perform power control related to NR SL transmission based on a downlink path loss between the NR base station and the NR modem (or UE). For example, when the UE performs NR SL transmission on an ITS-only carrier (for example, a carrier in which an NR base station does not exist), and/or when the NR modem (or UE) is located outside the coverage of the NR base station (on the NR licensed carrier) (for example, out-of-coverage situation), the UE may perform power control related to NR SL transmission based on the downlink path loss between the LTE base station and the LTE modem (or UE). For example, when the UE performs NR SL transmission on an ITS dedicated carrier, and/or when the NR modem (or UE) is located outside the coverage of the NR base station (on the NR licensed carrier), the UE may perform power control related to NR SL transmission without considering downlink path loss between the base station and the UE.

For example, the UE may be configured to perform power control related to LTE SL transmission or power control related to (CROSS-RAT scheduled) NR SL transmission based on a downlink path loss between the (pre-configured) synchronization reference base station (for example, gNB or eNB) and the UE (for example, NR modem/UE, LTE modem/UE). For example, the UE may be configured to perform power control related to LTE SL transmission or power control related to (CROSS-RAT scheduled) NR SL transmission based on a downlink path loss between the (pre-configured) RSRP measurement reference base station (for example, gNB or eNB) and the UE (for example, NR modem/UE, LTE modem/UE).

Based on an embodiment of the present disclosure, according to (part of) the following rules, the UE may transmit SCI including resource reservation information.

Here, for example, for the convenience of explanation, the maximum number of resources that the UE can signal/reserve through one SCI may be referred to as N_MAX. For example, N_MAX may be configured for a UE or may be configured in advance. For example, N_MAX may be configured in a resource pool-specific manner for the UE or configured in advance. For example, for the convenience of description, the number of resources signaled/reserved by a UE through one SCI may be referred to as N_SIG. For example, N_SIG may be less than or equal to N_MAX. For example, N_SIG may be determined by the implementation of the UE. For example, N_SIG may be configured for the UE or configured in advance. For example, for convenience of description, the number of resources selected by the UE may be referred to as N_RSC. For example, N_RSC may be the number of resources related to a specific TB transmission selected by the UE within the selection window.

For example, on SCI transmitted on the last reserved resource (related to N_RSC), the UE may signal/transmit only information on a pre-configured number of past reserved resources. For example, on SCI transmitted on the last reserved resource (related to N_RSC), the UE may signal/transmit only information on the maximum number (for example, N_MAX-1 or N_SIG-1) of past reserved resources that can be signaled by one SCI. For example, the past reserved resource may be a (relatively or closest) past reserved resource on the time axis from the SCI transmitted on the last resource. For example, on SCI transmitted on the last reserved resource (related to N_RSC), the UE may signal/transmit only information on the (reserved) resources through which the SCI is transmitted.

For example, on the SCI transmitted on the first reserved resource (related to N_RSC), the UE may signal/transmit only information on a pre-configured number of future reserved resources. For example, on the SCI transmitted on the first reserved resource (related to N_RSC), the UE may signal/transmit only information on the maximum number (for example, N_MAX-1 or N_SIG-1) of future reserved resources that can be signaled by one SCI. For example, the future reservation resource may be a (relatively or closest) future reservation resource in the time axis from the SCI transmitted on the first resource.

For example, on the SCI transmitted on the remaining reserved resources (related to N_RSC), The UE may signal/transmit information on a pre-configured number of past reserved resources and information on a pre-configured number of future reserved resources. For example, the pre-configured number may be a rounded value, a rounded-up value, or a rounded-down value of (N_MAX-1)/2. For example, the pre-configured number may be a rounded value, a rounded-up value, or a rounded-down value of (N_SIG-1)/2. For example, the past reserved resource may be a (relatively or closest) past reserved resource on the time axis from the SCI transmitted on the remaining resources. For example, the future reserved resource may be a (relatively or closest) future reserved resource on the time axis from the SCI transmitted on the remaining resources.

For example, the above-mentioned proposed rule may be (limitedly) applied when the UE periodically performs resource reservation. For example, the above-mentioned proposed rule may be (limitedly) applied to periodically generated traffic/packets. For example, the above-mentioned proposed rule may be (limitedly) applied when the UE aperiodically performs resource selection/reservation. For example, the above-mentioned proposed rule may be (limitedly) applied to aperiodically generated traffic/packets. For example, the above-described proposed rule may be (limitedly) applied when the N_MAX value is configured to 3. For example, the above-described proposed rule may be (limitedly) applied when the N_MAX value is configured to 2. For example, the above-described proposed rule may be (limitedly) applied when the N_SIG value is configured to 3. For example, the above-described proposed rule may be (limitedly) applied when the N_SIG value is configured to 2.

For example, herein, the information on the reserved resource may be interpreted as information on the location/number of (reserved) resource-related time/frequency resources, information bit about what resource number among the reserved resources (based one SCI) (for example, CEILING ($\log_2$(N_MAX)) bit or CEILING ($\log_2$(N_SIG)) bit, where CEILING (X) is the function that yields the smallest integer value greater than or equal to X), or a bit of a pre-configured size, and the like Based on an embodiment of the present disclosure, PUSCH transmission in which SL (control) information (for example, SL HARQ feedback information) is piggybacked and (other) SL channel/signal (hereinafter, OT_SLCH) transmission may be (partly) overlap in the time domain. In this case, according to (part of) the following rules, the UE may determine a channel/signal/information to be omitted from transmission or a channel/signal/information to be transmitted. Here, for example, for the convenience of explanation, SL (control) information piggybacked on PUSCH may be referred to as PIGGY_SLUCI.

For example, the UE may (first) compare (SL) priorities between PIGGY_SLUCI and OT_SLCH. In this case, for example, if PIGGY_SLUCI has a relatively higher (SL) priority than OT_SLCH, the UE may omit OT_SLCH transmission. Otherwise, for example, if OT_SLCH has a relatively higher (SL) priority than PIGGY_SLUCI, the UE may compare the priorities (again) between OT_SLCH and PUSCH. In this case, additionally, the following rules may be applied.

For example, if the PUSCH has a relatively higher priority than the OT_SLCH, the UE may omit the OT_SLCH transmission. In this case, (A) the UE may (still) piggyback PIGGY_SLUCI on the PUSCH and transmit it. Alternatively, (B) since PIGGY_SLUCI had a relatively lower priority than OT_SLCH, the UE may not piggyback PIGGY_SLUCI on the PUSCH, and the UE may omit the PIGGY_SLUCI transmission.

For example, if the OT_SLCH has a relatively higher priority than the PUSCH, the UE may omit the PUSCH transmission. In this case, (A) the UE may also omit the PIGGY_SLUCI transmission. Alternatively, (B) when PIGGY_SLUCI is not piggybacked to PUSCH, PIGGY_SLUCI-related channel transmission (for example, PUCCH) (hereinafter, ORI_ULCH) are not (partly) overlapped with OT_SLCH transmission in the time domain, the UE may perform both the ORI_ULCH transmission and the OT_SLCH transmission. If ORI_ULCH is (partially) overlapped with OT_SLCH transmission in the time domain, the UE may perform only transmission having a relatively high priority.

Based on an embodiment of the present disclosure, when the UE fails to select the (re)transmission resource of the maximum number of retransmissions (hereinafter, MX_RTNUM) within the selection window (hereinafter, LD_WIN) configured based on the latency budget and/or the delay budget, (part of) the following rules may be applied. Here, for example, LD_WIN may be related with a (generated) packet and/or (interlocked) LCH (and/or priority) (having highest priority). For example, MX_RTNUM may be related to a packet (for example, MAC PDU) and/or (interlocked) LCH (and/or priority) (having highest priority).

For example, the UE may select the HARQ RTT-based (re)transmission resource within LD_WIN, as much as possible. Thereafter, by triggering a new or additional resource (re)selection operation, the UE may select resource for the remaining number of retransmission (hereinafter, RM_RTNUM) (excluding the selected resource). For example, the UE may select, as much as possible, a (re)transmission resource (pair) in which retransmission based on HARQ feedback can be performed within LD_WIN. Thereafter, by triggering a new or additional resource (re)selection operation, the UE may select resources for RM_RTNUM retransmissions. Here, for example, the UE may select RM_RTNUM retransmission resources by assuming blind retransmission. For example, it may be configured to perform blind retransmission on the selected RM_RTNUM retransmission resources. For example, when the above rule is applied, the (actual) number of retransmission resources selected based on a newly or additionally triggered resource (re)selection operation may be limited by the number of selectable (maximum) retransmission resources within the delay budget, and may be less than or equal to RM_RTNUM. For example, the delay budget may relate to (generated) packets and/or (associated) LCH (and/or priority) (of highest priority). For example, the UE may (exceptionally) select a mixture of HARQ feedback-based retransmission resources and blind retransmission resources within LD_WIN, and the UE may select MX_RTNUM retransmission resources. Here, for example, the UE may preferentially select the HARQ feedback-based retransmission resource as much as possible (within LD_WIN), after that, the UE may select blind retransmission resources as many as the remaining number of retransmissions. Alternatively, for example, the UE may preferentially select a blind retransmission resource as much as possible (within LD_WIN), after that, the UE may select a HARQ feedback-based retransmission resource as many as the remaining number of retransmissions. Here, for example, when the above rule is applied, even for the HARQ (feedback) ENABLED MAC PDU (and/or LCH (related data)), it can be interpreted that blind retransmission or blind retransmission resource selection is (exceptionally) allowed for the UE. For example, when the proposed rule of the present disclosure is applied, LD_WIN may be interpreted as a selection window with a value smaller than the delay budget and/or a (virtual) delay budget. For example, the delay budget may relate to (generated) packets and/or (associated) LCH (and/or priority) (of highest priority). For example, the selection window having a value smaller than the delay budget may be a selection window having a pre-configured (proportion of) smaller value than the delay budget. Here, for example, the rule may be limitedly applied only to a HARQ (feedback) ENABLED MAC PDU and/or LCH (related data). For example, the rule may be limitedly applied only to a HARQ (feedback) DISABLED MAC PDU and/or LCH (related data).

Based on an embodiment of the present disclosure, depending on whether periodic resource reservation is allowed for the UE on the resource pool, the ratio (hereinafter, X_VAL) of the number of selectable resources that should be guaranteed to the minimum, after the sensing-based (high interference) resource exclusion operation, may be configured differently for the UE. For example, depending on whether periodic resource reservation is allowed for the UE on the resource pool, SL RSRP thresholds (for example, PSSCH DMRS RSRP, PSCCH DMRS RSRP) (for the combination of the priority related to the packet/data of the UE performing the sensing and the priority related to the detected packet/data of the other UE) used for sensing-based (high interference) resource exclusion operation may be configured differently for the UE. For example, depending on whether periodic resource reservation is allowed for the UE on the resource pool, the minimum size of the selection window (for example, the (minimum) T2 value (configured for each priority)) may be configured differently for the UE. For example, depending on whether periodic resource reservation is allowed for the UE on the resource pool, whether to configure an additional area within the selection window in which X_VAL must be guaranteed may be configured differently for the UE. For example, depending on whether periodic resource reservation is allowed for the UE on the resource pool, the size (related to the additional area) may be configured differently for the UE. For example, depending on whether periodic resource reservation is allowed for the UE on the resource pool, X_VAL at which an SL RSRP threshold increase is triggered (for the additional region or based on the additional region) may be configured differently for the UE.

For example, depending on whether only aperiodic resource reservation/selection is allowed for the UE on the resource pool, the ratio (hereinafter, X_VAL) of the number of selectable resources that must be guaranteed to a minimum after a sensing-based (high interference) resource exclusion operation may be configured differently for the UE. For example, depending on whether only aperiodic resource reservation/selection is allowed for the UE on the resource pool, SL RSRP thresholds (for example, PSSCH DMRS RSRP, PSCCH DMRS RSRP) (for the combination of the priority related to the packet/data of the UE performing the sensing and the priority related to the detected packet/data of the other UE) used for sensing-based (high interference) resource exclusion operation may be configured differently for the UE. For example, depending on whether only aperiodic resource reservation/selection is allowed for the UE on the resource pool, the minimum size of the selection window (for example, the (minimum) T2 value (configured for each priority)) may be configured differently for the UE. For example, depending on whether only aperiodic resource reservation/selection is allowed for the UE on the resource pool, whether to configure an additional area within the selection window in which X_VAL must be guaranteed may be configured differently for the UE. For example, depending on whether only aperiodic resource reservation/selection is allowed for the UE on the resource pool, the size (related to the additional area) may be configured differently for the UE. For example, depending on whether only aperiodic resource reservation/selection is allowed for the UE on the resource pool, X_VAL at which an SL RSRP threshold increase is triggered (for the additional region or based on the additional region) may be configured differently for the UE.

Based on an embodiment of the present disclosure, if the size of the frequency resource of the resource pool (hereinafter, POOL_FRQSIZE) is not a multiple of the size of the subchannel (hereinafter, SUB_SIZE), only when the UE performs transmission using all subchannels on the resource pool, the UE may be configured to (limitedly) (additionally) use the MOD (POOl_FRQSIZE, SUB_SIZE) number of RB(s) (here, MOD (X, Y) is a function that derives the remainder when X is divided by Y). Here, for example, the number of RB(s) of MOD (POOl_FRQSIZE, SUB_SIZE) may be configured as separate subchannels.

Based on an embodiment of the present disclosure, when the UE performs periodic resource reservation, according to (part of) the following rules, the number of reserved resources may be determined/derived. Here, for example, the rule may be limitedly applied only when the resource reservation period is smaller than a pre-configured threshold. For example, the rule may be limitedly applied only when the resource reservation period is greater than a pre-configured threshold value.

For example, the UE may randomly select one value within a pre-configured range (for example, 5 to 15). For the convenience of explanation, the one randomly selected value may be referred to as RAN_CVAL. Thereafter, the UE can calculate/obtain X_VAL by multiplying RAN_CVAL by (i) SC_VAL divided by RER_PD, (ii) MAX (20, RER_PD) value, or (iii) REF_PD divided by RER_PD. Here, the UE may consider/determine a result value, obtained by (again) multiplying X_VAL by a pre-configured scaling factor (for example, 10 or 1), as the number of reserved resources.

For example, SC_VAL may be at least one of PDB (in its own buffer and/or relating to LCH data (of highest priority)) (when performing resource reservation), latency requirements, the size of the selection window, MAX (100 ms, size of selection window (based on PDB of data)), and/or MAX (100 ms, PDB (of data)). For example, RER_PD may be a resource reservation period. For example, a value obtained by dividing SC_VAL by RER_PD may be CEILING (SC_VAL/RER_PD) or FLOOR (SC_VAL/RER_PD)). For example, RE_PD may be a pre-configured (reservation period) value. For example, a value obtained by dividing REF_PD by RER_PD may be CEILING (REF_PD/RER_PD) or FLOOR (REF_PD/RER_PD). Here, for example, CEILING (N) may be a function deriving an integer value greater than or equal to N, and FLOOR (N) may be a function deriving an integer value less than or equal to N.

For example, the range of candidate values from which RAN_CVAL is selected may be configured to be scaled by CEILING (X/Y) (or FLOOR (X/Y)). For example, a scaling factor (different for each TX_PVAL) applied to the range of candidate values from which RAN_CVAL is selected may be configured. Here, for example, TX_PVAL may be a resource reservation period value of a (TX) UE performing a sensing operation and/or resource reservation. For example, X may be a pre-configured (period) value. For example, depending on TX_PVAL and/or depending on whether TX_PVAL exceeds a pre-configured threshold (period) value, the X value may be configured differently or independently for the UE. For example, if the TX_PVAL value is (relatively) short (than a pre-configured threshold (period) value), a (pre-configured) (relatively) small value of X may be applied/used, if not (for example, if the TX_PVAL value is (relatively) longer (than the pre-configured threshold (period) value)), a (pre-configured) (relatively) large X value may be applied/used. For example, if the TX_PVAL value is (relatively) short (than a pre-configured threshold (period) value), a (pre-configured) (relatively) large value of X may be applied/used, if not (for example, if the TX_PVAL value is (relatively) longer (than the pre-configured threshold (period) value)), a (pre-configured) (relatively) small X value may be applied/used.

For example, the proposed rule of the present disclosure may be configured to be limitedly applied only when TX_PVAL is smaller than a pre-configured reference (period) value (for example, 100 ms). For example, the proposed rule of the present disclosure may be configured to be limitedly applied only when TX_PVAL is greater than a pre-configured reference (period) value (for example, 100 ms).

For example, when the above rules are applied, regardless of the change in the TX_PVAL value (for TX_PVAL less than the pre-configured reference (period) value), the CEILING (X/Y) value can be interpreted as being maintained within a (pre-configured) certain ratio/value (by adjusting the value of X (implicitly)). For example, when the above rules are applied, regardless of the change in the TX_PVAL value (for TX_PVAL greater than the pre-configured reference (period) value), the CEILING (X/Y) value can be interpreted as being maintained within a (pre-configured) certain ratio/value (by adjusting the value of X (implicitly)).

For example, Y may be assumed to be TX_PVAL. For example, Y may be regarded as a pre-configured (period) value. Here, for example, if Y is taken as a pre-configured (period) value, depending on TX_PVAL and/or whether TX_PVAL exceeds a pre-configured threshold (period) value, the Y value may be configured differently or independently for the UE. For example, if the TX_PVAL value is (relatively) small (than a pre-configured threshold (period) value), a (pre-configured) (relatively) small Y value may be applied/used, otherwise (for example, if the TX_PVAL value is (relatively) large (than a pre-configured threshold (period) value)), a (pre-configured) (relatively) large Y value may be applied/used. For example, if the TX_PVAL value is (relatively) small (than a pre-configured threshold (period) value), a (pre-configured) (relatively) large Y value may be applied/used, otherwise (for example, if the TX_PVAL value is (relatively) large (than a pre-configured threshold (period) value)), a (pre-configured) (relatively) small Y value may be applied/used. Here, for example, the rule may be configured to be limitedly applied only when TX_PVAL is smaller than a pre-configured reference (period) value (for example, 100 ms). For example, the rule may be configured to be limitedly applied only when TX_PVAL is greater than a pre-configured reference (period) value (for example, 100 ms). Also, for example, when the above rules are applied, regardless of the change in the TX_PVAL value (for TX_PVAL less than the pre-configured reference (period) value), it can be interpreted that CEILING (X/Y) is maintained at a certain ratio/value (pre-configured) (by adjusting Y (implicitly)). For example, when the above rules are applied, regardless of the change in the TX_PVAL value (for TX_PVAL greater than the pre-configured reference (period) value), it can be interpreted that CEILING (X/Y) is maintained at a certain ratio/value (pre-configured) (by adjusting Y (implicitly)).

Based on an embodiment of the present disclosure, the UE may perform a sensing-based resource exclusion operation. Here, it is assumed that the resource reservation period of another UE, in which the UE succeeds in detection/decoding, is P_VAL. In this case, for example, the UE may assume that CEILING (REF_VAL/P_VAL) resources are reserved/existed with a P_VAL period, and the UE may perform a resource exclusion operation (for the resource). For example, the UE may assume that CEILING (MAX (100 ms, (PDB-based size of data) selection window size)/MAX (20, P_VAL)) resources are reserved/existed with the P_VAL period (here, for example, MAX (X, Y) is the function that derives the maximum value among X and Y), and the UE may perform a resource exclusion operation (for the resource). For example, the UE may assume that CEILING ((PDB-based data) selection window size/MAX (20, P_VAL)) resources are reserved/existed with the P_VAL period, the UE may perform a resource exclusion operation (for the resource). For example, REF_VAL may be a pre-configured value (from the base station/network). For example, REF_VAL may be the size of the selection window. For example, REF_VAL may be the size of a selection window configured by a (TX) UE performing a sensing operation and/or resource reservation. For example, REF_VAL may be a result value obtained by multiplying the selection window size by a pre-configured ratio. For example, according to the resource reservation period value (hereinafter, P_VALTX) of the (TX) UE performing the sensing operation and/or resource reservation, REF_VAL may be configured differently or independently for the UE. For example, depending on whether P_VALTX exceeds a pre-configured threshold (period) value, REF_VAL may be configured differently or independently for the UE. For example, REF_VAL may be configured differently or independently for the UE according to the P_VAL value. For example, REF_VAL may be configured differently or independently for the UE, depending on whether P_VAL exceeds a pre-configured threshold (period) value.

For example, if the P_VALTX value or P_VAL value is (relatively) short (than the pre-configured threshold (period) value), a (pre-configured) (relatively) small REF_VAL value can be applied/used, otherwise (for example, if the P_VALTX value or the P_VAL value is (relatively) long (than the pre-configured threshold (period) value), a (pre-configured) (relatively) large REF_VAL value may be applied/used. For example, if the P_VALTX value or P_VAL value is (relatively) short (than the pre-configured threshold (period) value), a (pre-configured) (relatively) large REF_VAL value can be applied/used, otherwise (for example, if the P_VALTX value or the P_VAL value is (relatively) long (than the pre-configured threshold (period) value), a (pre-configured) (relatively) small REF_VAL value may be applied/used. Here, for example, the rule may be configured to be limitedly applied only when P_VALTX or P_VAL is smaller than a pre-configured reference (period) value (for example, 100 ms). For example, the rule may be configured to be limitedly applied only when P_VALTX or P_VAL is smaller than a pre-configured reference (period) value (for example, 100 ms). In addition, for example, when the above rules are applied, regardless of the change in the P_VALTX value or P_VAL value (for P_VALTX or P_VAL less than the pre-configured reference (period) value), it can be interpreted that CEILING (REF_VAL/P_VAL) is maintained at a certain (pre-configured) ratio/value (by adjusting REF_VAL or P_VAL (implicitly)). For example, when the above rules are applied, regardless of the change in the P_VALTX value or P_VAL value (for P_VALTX or P_VAL greater than the pre-configured reference (period) value), it can be interpreted that CEILING (REF_VAL/P_VAL) is maintained at a certain (pre-configured) ratio/value (by adjusting REF_VAL or P_VAL (implicitly)).

For example, whether or not the proposed rule of the present disclosure is applied and/or a related parameter (for example, REF_VAL) may be configured (or independently or differently) for a UE in a resource pool-specific manner. For example, whether or not the proposed rule of the present disclosure is applied and/or a related parameter (for example, REF_VAL) may be configured (or independently or differently) for a UE in a service type-specific manner. For example, whether or not the proposed rule of the present disclosure is applied and/or a related parameter (for example, REF_VAL) may be configured (or independently or differently) for a UE in a service priority-specific manner. For example, whether or not the proposed rule of the present disclosure is applied and/or a related parameter (for example, REF_VAL) may be configured (or independently or differently) for a UE in a QoS requirement (for example, URLLC/EMBB traffic, reliability, delay)-specific manner. For example, whether or not the proposed rule of the present disclosure is applied and/or a related parameter (for example, REF_VAL) may be configured (or independently or differently) for a UE in a cast type (for example, unicast, groupcast, broadcast)-specific manner. For example, whether or not the proposed rule of the present disclosure is applied and/or a related parameter (for example, REF_VAL) may be configured (or independently or differently) for a UE in a (resource pool) congestion level (for example, CBR)-specific manner. For example, whether or not the proposed rule of the present disclosure is applied and/or a related parameter (for example, REF_VAL) may be configured (or independently or differently) for a UE in an SL HARQ feedback scheme (for example, NACK ONLY feedback, ACK/NACK feedback)-specific manner. For example, whether or not the proposed rule of the present disclosure is applied and/or a related parameter (for example, REF_VAL) may be configured independently or differently for the UE, depending on whether the resource reservation period is smaller than or greater than a pre-configured threshold.

Figure 12:
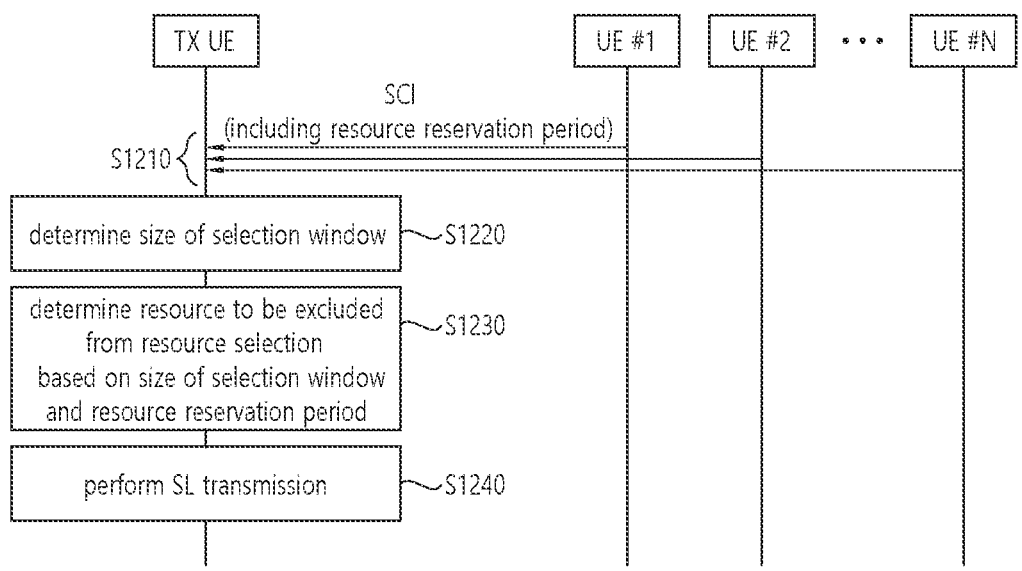
FIG. 12 shows a procedure for a UE to select a resource within a selection window based on an embodiment of the present disclosure.

FIG. 12 shows a procedure for a UE to select a resource within a selection window based on an embodiment of the present disclosure. The embodiment of FIG. 12 may be combined with various embodiments of the present disclosure.

Figure 13:
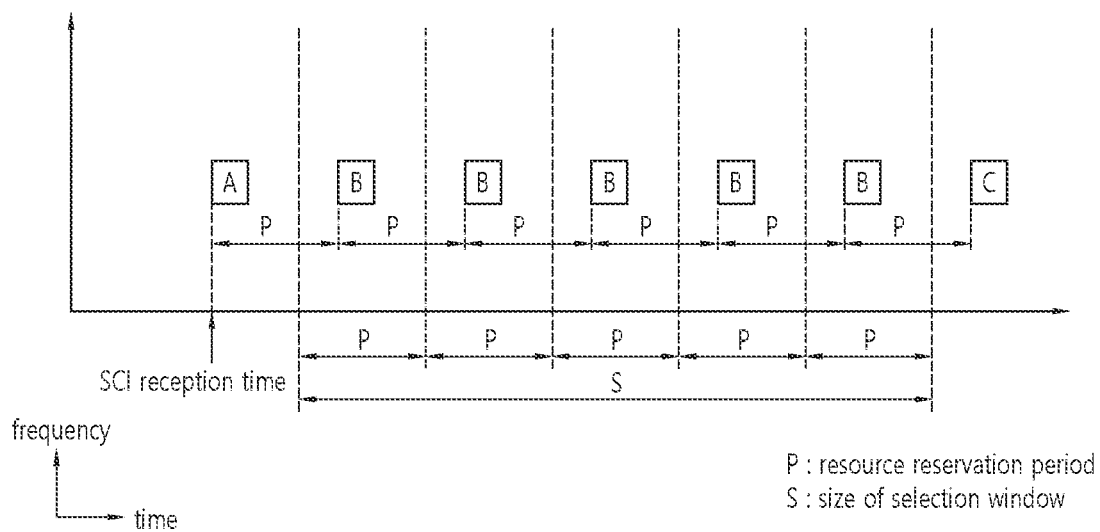
FIG. 13 shows a method for a UE to exclude a specific resource within a selection window, based on an embodiment of the present disclosure.

FIG. 13 shows a method for a UE to exclude a specific resource within a selection window, based on an embodiment of the present disclosure. The embodiment of FIG. 13 may be combined with various embodiments of the present disclosure.

Referring to FIG. 12, in step S1210, the TX UE may receive SCI from at least one UE (for example, UE #1 to UE #N). For example, the TX UE may receive the SCI from at least one UE within the sensing window. Here, for example, the SCI may include information related to a resource reservation period. For example, the SCI transmitted by UE #1 may include information related to a reservation period of a resource reserved/selected by UE #1, the SCI transmitted by UE #2 may include information related to a reservation period of a resource reserved/selected by UE #2, and the SCI transmitted by UE #N may include information related to a reservation period of a resource reserved/selected by UE #N.

For example, in NR resource allocation mode 2, the at least one UE may transmit the priority of SL transmission to the TX UE using SCI. For example, the TX UE may decode the SCI, and the TX UE may perform sensing and/or resource (re)selection based on the priority. For example, the resource (re) selection procedure may include the step of identifying, by the TX UE, candidate resources in the resource selection window, and the step of selecting, by the TX UE, a resource for (re)transmission from among the identified candidate resources.

In step S1220, the TX UE may determine the size of the selection window. In the present disclosure, the selection window may be referred to as a resource selection window. For example, the resource selection window may be a time interval during which the TX UE selects a resource for SL transmission. For example, after the TX UE triggers resource (re)selection, the resource selection window may start at T1≥0, the resource selection window may be limited by the remaining packet delay budget of the TX UE.

In step S1230, the TX UE may determine a resource to be excluded from resource selection based on the size of the selection window and the resource reservation period. For example, in the step of identifying, by the TX UE, candidate resources in the resource selection window, when a specific resource is indicated by the SCI, received by the TX UE from at least one UE, and if the L1 SL RSRP measurement value for the specific resource exceeds the SL RSRP threshold, the TX UE may not determine the specific resource as candidate resources. That is, in this case, the TX UE may not select the specific resource as a resource for SL transmission. For example, the SL RSRP threshold may be determined based on the priority of the SL transmission indicated by the SCI received by the TX UE and the priority of SL transmission on the resource selected by the TX UE.

For example, the TX UE may determine a resource to be excluded from resource selection based on Table 6.

TABLE 6

$(t_0^{'SL}, t_1^{'SL}, t_2^{'SL}, \ldots)$ denotes the set of slots which belongs to the sidelink resource pool. The UE shall exclude any candidate single-slot resource $R_{x,y}$ from the set $S_A$ if it meets all the following conditions:
(a) the UE receives an SCI format 1-A in slot $t_m^{'SL}$, and 'Resource reservation period' field, if present, and 'Priority' field in the received SCI format 1-A indicate the values $P_{rsvp\_RX}$ and $prio_{RX}$, respectively;
(b) the RSRP measurement performed, for the received SCI format 1-A, is higher than $Th(prio_{RX}, prio_{TX})$;
(c) the SCI format received in slot $t_m^{'SL}$ or the same SCI format which, if and only if the 'Resource reservation period' field is present in the received SCI format 1-A, is assumed to be received in slots(s) $t'^{SL}_{m+q \times P'_{rsvp\_RX}}$ determines the set of resource blocks and slots which overlaps with $R_{x,y+j \times P'_{rsvp\_TX}}$ for $q = 1, 2, \ldots, Q$ and $j = 0, 1, \ldots, C_{resel} - 1$.

Here, $P_{rsvp\_RX}'$ is $P_{rsvp\_RX}$ converted to units of logical slots according to clause 8.1.7, $Q = \left\lceil \dfrac{T_{scal}}{P_{rsvp\_RX}} \right\rceil$ if $P_{rsvp\_RX} < T_{scal}$ and $n' - m \leq P'_{rsvp\_RX}$, where $t'^{SL}_{n'} = n$ if slot n belongs to the set $(t_0^{'SL}, t_1^{'SL}, \ldots, t_{T_{max}-1}^{'SL})$, otherwise slot $t_{n'}^{'SL}$ is the first slot after slot n belonging to the set $(t_0^{'SL}, t_1^{'SL}, \ldots, t_{T_{max}-1}^{'SL})$; otherwise $Q = 1$. $T_{scal}$ is set to selection window size $T_2$ converted to units of msec.

Referring to Table 6, when (a), (b), and (c) are satisfied, the TX UE may exclude the corresponding resource (Rx, y) from the resource set (SA). That is, the TX UE may not select a resource that satisfies the conditions (a), (b), and (c). In this case, for example, the TX UE may assume that CEILING (REF_VAL/P_VAL) resources are reserved/existed in a P_VAL period, and the TX UE may perform a resource exclusion operation for the resources. For example, REF_VAL may be the size of the selection window. For example, REF_VAL may be the size of a selection window configured by a (TX) UE performing a sensing operation and/or resource reservation. For example, Y=CEILING (X) may be a function that derives the smallest integer value greater than or equal to X.

In the embodiment of FIG. 13, it is assumed that the TX UE receives SCI from another UE based on resource A. And, it is assumed that 5 times the resource reservation period (P) is equal to the size (S) of the selection window (that is, 5*P=S). Specifically, it is assumed that the resource reservation period is 10 ms and the size of the selection window is 50 ms. In this case, the TX UE may determine that CEILING (S/P) resources (that is, resource B in FIG. 13) are selected/reserved by the UE that transmitted the SCI, the TX UE may not select CEILING (S/P) resources (that is, resource B in FIG. 13). On the other hand, the TX UE may determine that the resource after the CEILING (S/P) resource (that is, resource C in FIG. 13) is not selected/reserved by the UE that transmitted the SCI, it may be allowed for the TX UE to select resource C of FIG. 13.

According to the prior art, when the TX UE receives SCI from another UE based on resource A, TX UE may determine that CEILING (100 [ms]/P) resources are selected/reserved by the UE that transmitted the SCI, TX UE may not select a resource of CEILING (100 [ms]/P). Here, P may be a resource reservation period in 'ms'. That is, according to the prior art, the TX UE cannot select resource C as well as resource B of FIG. 13. This may lead to an unnecessary resource exclusion operation of an unnecessary UE. On the other hand, according to the proposed method, based on the size of the selection window and the resource reservation period, the TX UE may perform an efficient resource exclusion operation.

Referring back to FIG. 12, in step S1240, the TX UE may select at least one resource from the remaining resources except for the excluded resources. And, the TX UE may transmit a PSCCH and/or a PSSCH based on the at least one resource.

Based on an embodiment of the present disclosure, in the CR calculation/counting process, the UE may not reflect the SL (retransmission) reservation resource (signaled by SCI) that will not be used in the CR calculation/counting based on the HARQ feedback (for example, ACK) (received from RX UE). For example, the UE may not reflect the number of subchannels related to the SL (retransmission) reservation resource (signaled by SCI) that will not be used in the CR calculation/counting based on the HARQ feedback (for example, ACK) (received from RX UE). For example, the UE may not reflect the SL (retransmission) reservation resource (signaled by SCI) that will not be used based on the UL/SL prioritization in the CR calculation/counting. For example, the UE may not reflect the number of subchannels related to the SL (retransmission) reservation resource (signaled by SCI) that will not be used in the CR calculation/counting, based on the UL/SL prioritization. For example, the UL/SL prioritization situation may be a situation in which the UE omits SL transmission, due to overlapping of high-priority UL transmission and SL transmission. Here, for example, the above rule may be configured to be limitedly applied only when the (related) SL grant (for example, retransmission reservation resource) is released based on the reception of the HARQ feedback (for example, ACK). For example, the above rule may be configured to be limitedly applied only when the (related) SL grant (for example, retransmission reservation resource) is cleared based on the reception of the HARQ feedback (for example, ACK). For example, the above rule may be configured to be limitedly applied only when the (interlocked) HARQ buffer is flushed. For example, the above rule may be configured to be limitedly applied only to the case of an SL grant generated for transmission of a single MAC PDU. For example, the rule may be configured to be limitedly applied only to the case of an SL grant generated for transmission of multiple MAC PDUs.

Alternatively, for example, even though the (related) SL grant (for example, retransmission reservation resource) is released/cleared based on reception of HARQ feedback (for example, ACK) or the (associated) HARQ buffer is flushed, since other (some) UEs on the system may not be able to use the released/cleared (re)transmission resource, the UE may be configured to (still) reflect the resource in CR calculation/counting. For example, even though the (related) SL grant (for example, retransmission reservation resource) is released/cleared based on reception of HARQ feedback (for example, ACK) or the (associated) HARQ buffer is flushed, since other (some) UEs on the system may not be able to use the released/cleared (re)transmission resource, the UE may be configured to (still) reflect the resource in CR calculation/counting, in a resource pool-specific manner. For example, even though the (related) SL grant (for example, retransmission reservation resource) is released/cleared based on reception of HARQ feedback (for example, ACK) or the (associated) HARQ buffer is flushed, since other (some) UEs on the system may not be able to use the released/cleared (re)transmission resource, the UE may be configured to (still) reflect the resource in CR calculation/counting, in a service type-specific manner. For example, even though the (related) SL grant (for example, retransmission reservation resource) is released/cleared based on reception of HARQ feedback (for example, ACK) or the (associated) HARQ buffer is flushed, since other (some) UEs on the system may not be able to use the released/cleared (re)transmission resource, the UE may be configured to (still) reflect the resource in CR calculation/counting, in a service priority-specific manner. For example, even though the (related) SL grant (for example, retransmission reservation resource) is released/cleared based on reception of HARQ feedback (for example, ACK) or the (associated) HARQ buffer is flushed, since other (some) UEs on the system may not be able to use the released/cleared (re)transmission resource, the UE may be configured to (still) reflect the resource in CR calculation/counting, in a (resource pool) congestion level-specific manner.

For example, due to pre-emption and/or UL/SL prioritization, even though the UE cannot use the previously reserved (retransmission) resource or the UE releases/clears the previously reserved (retransmission) resource and performs reselection of the (retransmission) resource, since other (some) UEs on the system may not be able to use the released/cleared (re)transmission resource, the UE may be configured to (still) reflect the resource in CR calculation/counting. For example, due to pre-emption and/or UL/SL prioritization, even though the UE cannot use the previously reserved (retransmission) resource or the UE releases/clears the previously reserved (retransmission) resource and performs reselection of the (retransmission) resource, since other (some) UEs on the system may not be able to use the released/cleared (re)transmission resource, the UE may be configured to (still) reflect the resource in CR calculation/counting, in a resource pool-specific manner. For example, due to pre-emption and/or UL/SL prioritization, even though the UE cannot use the previously reserved (retransmission) resource or the UE releases/clears the previously reserved (retransmission) resource and performs reselection of the (retransmission) resource, since other (some) UEs on the system may not be able to use the released/cleared (re)transmission resource, the UE may be configured to (still) reflect the resource in CR calculation/counting, in a service priority-specific manner. For example, due to pre-emption and/or UL/SL prioritization, even though the UE cannot use the previously reserved (retransmission) resource or the UE releases/clears the previously reserved (retransmission) resource and performs reselection of the (retransmission) resource, since other (some) UEs on the system may not be able to use the released/cleared (re)transmission resource, the UE may be configured to (still) reflect the resource in CR calculation/counting, in a (resource pool) congestion level-specific manner.

Here, for example, when the above rule is applied, during retransmission operation based on HARQ feedback reception, it is possible to prevent the UE from excessively reserving (retransmission) resources.

Based on an embodiment of the present disclosure, the $2^{nd}$ SCI format may be determined as follows. For example, the $2^{nd}$ SCI format may include $2^{nd}$ SCI format A and/or $2^{nd}$ SCI format B.

For example, the $2^{nd}$ SCI format A may
  not include (of TX UE) zone ID field and communication range field, where, the communication range field may be related to a transmission MAC PDU (for example, TB) and/or (interlocked) service, and/or
  be configured to be used/specified when (depending on whether PSSCH decoding success or not) HARQ feedback scheme (based on unicast and/or groupcast) in which ACK or NACK information is transmitted (hereinafter, HARQ_FDTYPE1) (and/or (groupcast) NACK ONLY HARQ feedback scheme (which is not based on the distance between TX UE and RX UE)) is used/requested, and/or
  be configured to be used/specified when SL communication based on unicast and/or groupcast is performed (and/or when the groupcast HARQ feedback scheme based on HARQ_FDTYPE3 is used/requested), and/or
  include HARQ feedback ENABLED/DISABLED indicator (field) (hereinafter, HQ_EDFD).

For example, the $2^{nd}$ SCI format B may
  include a zone ID field (of the TX UE) and a communication range field, where the communication range field may be related to a transmission MAC PDU (for example, TB) and/or (interlocked) service, and/or
  be configured to be used/specified when the (group cast) NACK ONLY HARQ feedback scheme (hereinafter, HARQ_FDTYPE2) based on the distance between the TX UE and the RX UE (and/or the (groupcast) NACK ONLY HARQ feedback scheme (hereinafter, HARQ_FDTYPE3) (not based on the distance between TX UE and RX UE)) is used/requested, and/or
  be configured to be used/specified when groupcast-based SL communication is performed (and/or when HARQ_FDTYPE2 (and/or HARQ_FDTYPE3)-based groupcast HARQ feedback scheme is used/requested), and/or
  include HARQ feedback ENABLED/DISABLED indicator (field).

Here, for example, on the $2^{nd}$ SCI format A and/or the $2^{nd}$ SCI format B, a field, for the RX UE (from TX UE), informing which parameter-based PSFCH resource should be used to transmit HARQ feedback and/or what method/type-based HARQ feedback should be performed (hereinafter, as MID_FIELD) may be defined. For example, the field may have a pre-configured size (for example, 1 bit).

Specifically, for example, if MID_FIELD is indicated as 0, the RX UE may specify/determine a (group) member ID parameter (for example, M_ID) value of 0 in the formula for determining the PSFCH resource (index), and the RX UE may determine/derive a PSFCH resource (index), through which HARQ feedback is transmitted, based on M_ID=0. For example, if MID_FIELD is indicated as 0, the RX UE may specify/determine a (group) member ID parameter (for example, M_ID) value of 0 in the formula for determining the PSFCH resource (index), and the RX UE may apply a (unicast-based) HARQ feedback scheme in which (pre-configured) ACK or NACK information is transmitted. For example, if MID_FIELD is indicated as 0, the RX UE may specify/determine a (group) member ID parameter (for example, M_ID) value of 0 in the formula for determining the PSFCH resource (index), and the RX UE may apply the HARQ feedback scheme of HARQ_FDTYPE2. For example, if MID_FIELD is indicated as 0, the RX UE may specify/determine a (group) member ID parameter (for example, M_ID) value of 0 in the formula for determining the PSFCH resource (index), and the RX UE may apply the HARQ feedback scheme of HARQ_FDTYPE3.

For example, if MID_FIELD is indicated as 1, the RX UE may designate/determine the member ID parameter (for example, M_ID) value in the formula for determining the PSFCH resource (index) as the (member ID) value provided by the (own) upper layer (for example, V2X layer), and the RX UE may determine/derive a PSFCH resource (index) through which HARQ feedback is transmitted based on the (member ID) value. For example, if MID_FIELD is indicated as 1, the RX UE may designate/determine the member ID parameter (for example, M_ID) value in the formula for determining the PSFCH resource (index) as the (member ID) value provided by the (own) upper layer (for example, V2X layer), and the RX UE may apply a (groupcast-based) HARQ feedback scheme in which ACK or NACK information is transmitted based on a (member ID) value.

For example, if the HQ_EDFD field is indicated as DISABLED, the MID_FIELD field may be designated/configured as a pre-configured (specific) value (for example, 0 or 1) (hereinafter, FX_VAL). For example, if the TX UE does not request HARQ feedback from the RX UE, the MID_FIELD field may be designated/configured as FX_VAL. For example, when the TX UE transmits a HARQ DISABLED MAC PDU (and/or LCH related data) to the RX UE, the MID_FIELD field may be designated/configured as FX_VAL. For example, when the TX UE performs blind retransmission (for transmission MAC PDU), the MID_FIELD field may be designated/configured as FX_VAL. Here, for example, when the above rule is applied, (if the HQ_EDFD field is indicated as DISABLED), when the MID_FIELD field is designated as a value other than FX_VAL, it may be considered to indicate other (pre-configured) information/state (for example, type of cast (for example, the distinction between groupcast and unicast, the distinction of groupcast and/or unicast from broadcast)) (for example, it can be interpreted as a kind of reserved status (to be used in future RELEASE)).

For example, through a predefined field (for example, 2 bits) on the $2^{nd}$ SCI format A and/or the $2^{nd}$ SCI format B and/or the $1^{st}$ SCI format, it may be configured to be signaled the cast type information and/or HARQ feedback scheme information. For example, through a predefined field (for example, 2 bits) on the $2^{nd}$ SCI format A and/or the $2^{nd}$ SCI format B and/or the $1^{st}$ SCI format, the UE may transmit cast type information and/or HARQ feedback scheme information. Here, for example, through a predefined field of 2 bits, any one of a unicast HARQ feedback scheme, a groupcast (type 1) HARQ feedback option 1, a groupcast (type 2) HARQ feedback option 2, or broadcast may be indicated. For example, the unicast HARQ feedback scheme may be in the form of an ACK/NACK HARQ feedback. For example, according to the unicast HARQ feedback scheme, the UE may consider the (group) member ID parameter (for example, M_ID) value in the formula for determining the PSFCH resource (index) to be 0, and then, may determine/derive a PSFCH resource (index) through which the HARQ feedback is transmitted. For example, the groupcast (type 1) HARQ feedback option 1 may be in the form of a NACK ONLY HARQ feedback. For example, according to groupcast (type 1) HARQ feedback option 1, the UE may consider the (group) member ID parameter (for example, M_ID) value in the formula for determining the PSFCH resource (index) to be 0, and then, may determine/derive a PSFCH resource (index) through which the HARQ feedback is transmitted. For example, groupcast (type 2) HARQ feedback option 2 may be in the form of ACK/NACK HARQ feedback. For example, according to groupcast (type 2) HARQ feedback option 2, the UE may consider the (group) member ID parameter (for example, M_ID) value in the formula for determining the PSFCH resource (index) as the (member ID) value provided by the upper layer (of the UE), and then, may determine/derive a PSFCH resource (index) through which the HARQ feedback is transmitted. For example, the broadcast scheme may be a form in which HARQ feedback is disabled.

Figure 14:
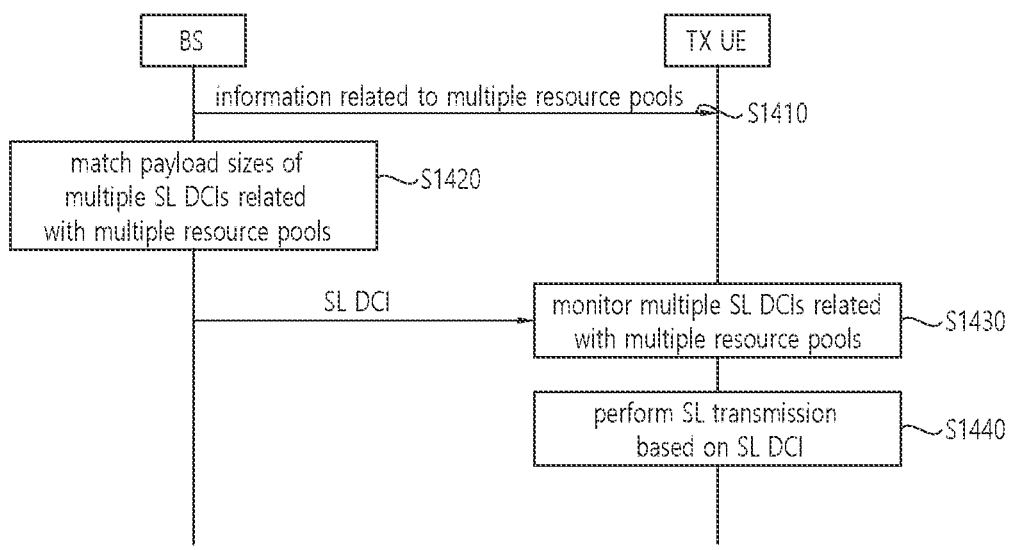
FIG. 14 shows a procedure in which a base station performs size alignment for SL DCI based on an embodiment of the present disclosure.

FIG. 14 shows a procedure in which a base station performs size alignment for SL DCI based on an embodiment of the present disclosure. FIG. 14 could be combined with various embodiments of the present disclosure.

Based on an embodiment of the present disclosure, multiple resource pools may be configured or pre-configured for a UE. For example, multiple resource pools may be multiple mode 1 resource pools. For example, in step S1410, the base station may transmit information related to the multiple resource pools to the UE. In the above-described case, on the mode 1 DCI (for example, DCI format 3_0) transmitted by the base station, the index field (hereinafter, RP_FID) of the (interlocked) resource pool may be defined. Here, for example, when the base station transmits mode 1 DCI to the UE, the base station may inform the UE for which resource pool the mode 1 DCI is scheduling. For example, when the base station transmits mode 1 DCI to the UE, the base station may inform which resource pool the mode 1 DCI is related with.

In the above case, for example, if (some) parameters and/or operations below (related to MODE 1 operation) can be configured differently between the multiple mode 1 resource pools, a payload size (of MODE 1 DCI) may vary depending on a resource pool targeted by the mode 1 DCI.

Ex) the maximum number of time resources (for example, slots) that can be signaled by mode 1 DCI, and/or the maximum number of time resources (for example, slots) that can be signaled by SCI, and/or Ex) the number of subchannels constituting the resource pool, and/or Ex) whether a CG action is configured, and/or whether monitoring for mode 1 DCI (for example, DCI format 3_0) based on CRC scrambled with SL-CS-RNTI is configured (for example, accordingly, whether (CG) configuration index field (on the CG/DG related mode 1 DCI) exists or not is determined), and/or Ex) whether a PUCCH resource is configured, and/or whether a reporting operation for SL HARQ feedback information through PUCCH is configured, and/or HARQ codebook type applied when reporting SL HARQ feedback information through PUCCH, and/or Ex) the number of candidate values that can be designated as a time gap between the PSFCH slot and the PUCCH slot, for example, the number of candidate values that can be designated as a time gap between the PSFCH slot and the PUCCH slot when a reporting operation for SL HARQ feedback information through PUCCH is configured, and/or Ex) (SL) (maximum) number of HARQ process IDs, for example, (maximum) number of (SL) HARQ process IDs related to mode 1 DCI operation and/or SL operation However, since the UE cannot know in advance the resource pool targeted by the mode 1 DCI transmitted by the base station, there may be a problem in that the UE has to perform blind search/decoding for payload sizes of the multiple mode 1 DCIs (which may be different for each resource pool).

In order to alleviate the above-mentioned problem, for example, payload sizes of multiple mode 1 DCIs respectively related with the multiple resource pools may be aligned. For example, in step S1420, the base station may match the payload sizes of the multiple mode 1 DCIs respectively related with the multiple resource pools. In step S1430, the UE may monitor the multiple mode 1 DCIs. For the convenience of explanation, a case, in which payload sizes of multiple mode 1 DCIs respectively related with the multiple resource pools are aligned, may be referred to as option A. Hereinafter, a specific example of option A will be described.

For example, to the largest payload size among the payload sizes of the multiple (different) mode 1 DCIs related with the multiple resource pools, the payload size of the remaining mode 1 DCI may be aligned (for example, zero padding). For example, the base station may align the payload sizes of the multiple mode 1 DCIs to the largest payload size, by performing zero padding on the payloads of the remaining mode 1 DCIs. Table 7 shows an example of matching the payload sizes of the multiple mode 1 DCIs (for example, DCI format 3_0).

pool A, resource pool B, resource pool C, resource pool D) are configured for the UE, and the size of the DCI related with resource pool A is the largest. In this case, by performing zero padding on the DCI related with the remaining resource pool (for example, DCI related with resource pool B, DCI related with resource pool C, DCI related with resource pool D), the base station may align the sizes of a plurality of DCIs (for example, the size of the DCI related with resource pool A, the size of the DCI related with resource pool B, the size of the DCI related with resource pool C, the size of the DCI related with resource pool D) with each other. In addition, the UE may monitor or receive the multiple DCIs based on the aligned DCI size. Additionally, when the size of DCI format 3_0 does not aligned with the size of DCI format 3_1, by performing zero padding on the DCI format having a small size, the base station may align the size of DCI format 3_0 with the size of DCI format 3_1. Here, for example, DCI format 3_0 may be DCI used for scheduling NR PSCCH and NR PSSCH in one cell, DCI format 3_1 may be DCI used for scheduling LTE PSCCH and LTE PSSCH in one cell.

For example, to the smallest payload size among the multiple (different) mode 1 DCI payload sizes related with the multiple resource pools, the payload size of the remaining mode 1 DCI may be aligned (for example, (field or bit) truncation). For example, by performing truncation on the payload of the remaining mode 1 DCI, the base station may align the payload sizes of the multiple mode 1 DCIs to the smallest payload size.

For example, payload sizes of the multiple (different) mode 1 DCIs related with the multiple resource pools may be aligned to a pre-configured (reference) payload size (for example, (field or bit) truncation or zero padding). For example, by performing truncation or zero padding on the payloads of the multiple mode 1 DCIs, the base station may align the payload sizes of the multiple mode 1 DCIs to a pre-configured (reference) payload size.

For example, all of the parameters and/or the operation may be identically configured between the multiple resource pools (related to the MODE 1 operation). For the convenience of explanation, a case, in which all of the parameters and/or the operation are identically configured between the multiple resource pools, may be referred to as option B. For example, according to option B, the UE may not expect that the payload size of the mode 1 DCI used for scheduling for different resource pools is (partially) different. For example, according to option B, the UE may determine/assume that

TABLE 7

If multiple transmit resource pools are provided in sl-TxPoolScheduling, zeros shall be appended to the DCI format 3_0 until the payload size is equal to the size of a DCI format 3_0 given by a configuration of the transmit resource pool resulting in the largest number of information bits for DCI format 3_0.
If the UE is configured to monitor DCI format 3_1 and the number of information bits in DCI format 3_0 is less than the payload of DCI format 3_1, zeros shall be appended to DCI format 3_0 until the payload size equals that of DCI format 3_1.
If the UE is configured to monitor DCI format 3_0 and the number of information bits in DCI format 3_1 is less than the payload of DCI format 3_0, zeros shall be appended to DCI format 3_1 until the payload size equals that of DCI format 3_0.

Referring to Table 7, when the multiple resource pools are configured for the UE, until being equal to the size of the DCI having the largest size among the multiple DCIs (for example, DCI format 3_0), the base station may perform zero padding on the remaining DCI. For example, it may be assumed that four resource pools (for example, resource the payload sizes of mode 1 DCI used for scheduling for different resource pools are all the same.

For example, index information (bits) of the (interlocked) resource pool may be masked and/or scrambled to the mode 1 DCI related CRC. For the convenience of explanation, a case, in which index information (bits) of the (interlocked)

resource pool is masked and/or scrambled to the mode 1 DCI-related CRC, may be referred to as option C. For example, the mode 1 DCI related CRC may be (pre-configured) CRC least significant bit (LSB) X bits For example, X may be a positive integer. For example, X may be 3.

Additionally, for example, a payload size may be identical between a DCI format (for example, DCI format 0_1 or DCI FORMAT 0_0) (hereinafter, REF_UUDCI) related to pre-configured Uu communication (for example, communication between a base station and a UE) and a mode 1 DCI (for example, DCI format 3_0). For example, the base station may align the payload size between the REF_UUDCI and the mode 1 DCI (for example, DCI format 3_0). For example, in order to prevent the (maximum) number of blind decodings (which the UE can support) from being exceeded, the payload size may be aligned between the REF_UUDCI and the mode 1 DCI. For example, to prevent the (maximum) number of DCI format budgets from being exceeded, the payload size may be aligned between the REF_UUDCI and the mode 1 DCI.

In the above case, for example, the largest payload size (hereafter, REP_SLSIZE) among the payload sizes of mode 1 DCIs related to the multiple source pools derived based on option A and the payload size of the SL DCI format (for example, DCI format 3_1) used by the NR base station for scheduling of the LTE SL may be aligned. For example, the smallest payload size (hereafter, REP_SLSIZE) among the payload sizes of mode 1 DCIs related to the multiple source pools derived based on option A and the payload size of the SL DCI format (for example, DCI format 3_1) used by the NR base station for scheduling of the LTE SL may be aligned. Additionally, for example, the payload size of REP_SLSIZE and REF_UUDCI may be aligned. For example, the base station may align the payload size of the SL DCI format (for example, DCI format 3_1) used by the NR base station for scheduling of LTE SL and REP_SL-SIZE, and the base station may align the payload sizes of REF_UUDCI and REP_SLSIZE. In this case, for example, if the payload size of REF_UUDCI is larger than REP_SL-SIZE, all of the payload sizes of mode 1 DCIs related to the plurality of resource pools may be aligned to the payload sizes of REF_UUDCI. For example, if the payload size of REF_UUDCI is larger than REP_SLSIZE, by performing zero padding on the payload size of mode 1 DCIs related to the multiple resource pools, the base station may align the payload size of mode 1 DCIs related to the multiple resource pools to the payload size of REF_UUDCI.

For example, if the base station aligns the (total) payload size between mode 1 DCIs (related to multiple resource pools) based on option A, the base station may be configured to align the payload size in terms of the overall payload. For the convenience of explanation, a case, in which the base station is configured to align the payload size in terms of the overall payload, may be referred to as method A. For example, according to method A, the base station performs zero padding on the mode 1 DCI of the (relatively) small overall payload size, so that it has the same (payload) size as the mode 1 DCI of the largest overall payload size. For example, according to method A, the base station performs zero padding after the last (LSB) bit of the mode 1 DCI of the (relatively) small overall payload size, so that it has the same (payload) size as the mode 1 DCI of the largest overall payload size.

For example, if the base station aligns the (total) payload size between the mode 1 DCIs (related to multiple resource pools) based on option A, the base station may be configured to align the overall payload size by aligning the size in terms of each field. For the convenience of explanation, a case, in which the base station is configured to align the overall payload size by aligning the size in terms of each field, may be referred to as method B. For example, according to method B, when the size of a specific field (for example, frequency resource allocation field) of mode 1 DCI related to resource pool X is larger than the size of the same-purpose field of mode 1 DCI related to resource pool Y, the base station may align the field size of the latter with the field size of the former. In this case, for example, the base station may perform zero padding on the most significant bit (MSB) of the field of the latter. For example, the base station may perform zero padding on the least significant bit (LSB) of the field of the latter.

For example, when method B is applied, it may be interpreted that the field types/configurations on the mode 1 DCIs related to multiple resource pools are the same. For example, when method B is applied, it may be interpreted that the field (disposition) order on the mode 1 DCIs related to multiple resource pools is the same.

For example, when the field types/configurations on Mode 1 DCIs related to multiple resource pools are different, Method B can be applied to the fields that exist identically, Method A may be applied to the remaining. Through this, for example, the payload size may be configured to be aligned between mode 1 DCIs. For example, by applying method A (exceptionally), the payload size may be configured to be aligned between mode 1 DCIs.

For example, the size of a field for the same purpose and/or existence of a field for a specific purpose may be different between Mode 1 DCIs related to multiple resource pools, and/or the number of mode 1 resource pools configured for each carrier may be different. Accordingly, in consideration of this, a field indicating an index of a carrier on which an SL (transmission) resource is scheduled (hereinafter, CIF) may be defined to appear preferentially on the mode 1 DCI over the RP_FID field. For example, in mode 1 DCI, the CIF field may be defined as the first field, the RP_FID field may be defined as the second field, the (frequency/time) resource information field may be defined after the third field. For example, the CIF may be defined to appear preferentially on the mode 1 DCI over the PSSCH and/or PSCCH-related time/frequency (transmission) resource information (for example, location/number) field. For example, the CIF (related to the first PSSCH transmission) may be defined to appear preferentially on the mode 1 DCI over the PSCCH (start) frequency (transmission) resource information field.

For example, the above rules may be limitedly applied only to the method A-based operation. For example, the above rules may be limitedly applied only to the method B-based operation. Through this, for example, the UE may decode the CIF field and/or the RP_FID field, regardless of a field of a changed size. For example, the UE may decode the CIF field and/or the RP_FID field, regardless of a field of a size that is changed according to a resource pool and/or a carrier.

For example, a synchronization reference source used for mode 1 SL operation and/or selectable for mode 1 SL operation may be identically configured on multiple resource pools. For example, a synchronization reference source used for mode 1 SL operation and/or selectable for mode 1 SL operation may be configured differently on multiple resource pools.

For example, between SL CSI reporting operations triggered based on multiple resource pools, it may be allowed (exceptionally) that the SL CSI reporting latency bounds are overlapped. For example, in the case of an SL CSI reporting operation triggered based on multiple resource pools, before the UE (successfully) receives the SL CSI information for the SL CSI report triggered based on a specific resource pool, it may be allowed (exceptionally) for the UE to (additionally) trigger the SL CSI report based on another resource pool.

For example, the proposed rule of the present disclosure may be limitedly applied only to DCI related to mode 1 CG type 2. For example, the proposed rule of the present disclosure may be limitedly applied only to mode 1 DG DCI.

In step S1440, the UE may perform SL transmission based on the received DCI.

According to the proposed method, since the maximum number of blind decoding that a UE supports may not be exceeded, the complexity of the UE due to the blind decoding for DCI can be reduced. In addition, according to the proposed method, since the maximum number of DCI format budgets of the UE may not be exceeded, the complexity of the UE due to the blind decoding for DCI may be reduced.

Based on an embodiment of the present disclosure, when SL communication (for example, unicast or groupcast) is performed between UEs, when a UE changes the synchronization source/reference (hereinafter, SL_REF), the UE may declare (SL) RLF for the corresponding SL communication (link) and/or SL session and/or PC5 RRC connection. For example, if the UE changes SL_REF to another SL_REF after establishing a session (related to SL communication (link)), the UE may declare (SL) RLF for the corresponding SL communication (link) and/or SL session and/or PC5 RRC connection. For example, if a UE changes the SL_REF to another SL_REF before establishing a session (related to SL communication (link)), the UE may declare (SL) RLF for the corresponding SL communication (link) and/or SL session and/or PC5 RRC connection. For example, when SL communication (for example, unicast or groupcast) is performed between UEs, if the difference value, between the (time/frequency) synchronization related to the changed SL_REF and the (time/frequency) synchronization related to the SL_REF before the change, exceeds a pre-configured threshold (for example, CP length), the UE may declare (SL) RLF for the corresponding SL communication (link) and/or SL session and/or PC5 RRC connection.

Based on an embodiment of the present disclosure, the UE may transmit a plurality of PSFCHs. For the convenience of explanation, the number of a plurality of PSFCHs transmissions may be referred to as K_VAL. In this case, for example, the sum of transmit power required for the plurality of PSFCH transmissions may exceed the maximum transmission power value of the UE and/or the PCMAX value calculated based on K_VAL PSFCH transmissions (hereinafter, power limited case). In this case, according to (part of) the following rules, the UE may determine PSFCH to be transmitted, and the UE may determine the transmission power (related to the transmitted PSFCH). Here, for example, K_VAL may be assumed/considered to be less than or equal to the maximum number of PSFCHs that the UE can transmit simultaneously.

For example, after the UE divides the PSFCH group for each (interlocked) priority value, the UE may increase the number of transmitted PSFCH groups in the descending order of priority values (for example, a larger priority value is interpreted as a higher priority). In this case, when the power-limited case is reached, (A) the UE may omit (all) the transmission (hereinafter, PF_GR_PL) for the PSFCH group of the priority which is involved lastly (which causes that the power-limited case), and/or (B) to avoid reaching the power limited case, the UE may determine/select how many PSFCHs to perform among the PSFCHs included in PF_GR_PL according to the UE implementation. In addition, for example, when transmitting the highest priority PSFCH group, if the power limited case is reached, in order not to reach the power limited case, the UE may determine/select how many PSFCHs transmission to perform among the PSFCHs included in the PSFCH group according to UE implementation.

For example, (under the example situation (where the rules are applied) described above (for example, power-limited case)), the minimum number of simultaneously transmitted PSFCHs may be configured as the (total) number of PSFCHs having a priority higher than or equal to PSFCH of priority K and/or the (total) number of PSFCHs belonging to the PSFCH group (hereinafter, NPF_K). For example, (under the example situation (where the rules are applied) described above (for example, power-limited case)), the minimum number of simultaneously transmitted PSFCHs may be configured as the (total) number of PSFCHs having a priority lower than or equal to the PSFCH of priority K and/or the (total) number of PSFCHs belonging to the PSFCH group (hereinafter, NPF_K). For example, (under the example situation (where the rules are applied) described above (for example, power-limited case)), the minimum number of simultaneously transmitted PSFCHs may be configured as the maximum value among NPF_K and 1. Here, for example, when PSFCH transmissions of the (total) number of PSFCHs having a priority higher than or equal to that of the PSFCH of priority K and/or the (total) number of PSFCHs belonging to the PSFCH group are performed, the power limited case should not be reached. For example, when PSFCH transmissions of the (total) number of PSFCHs of priority lower than or equal to the PSFCH of priority K and/or the (total) number of PSFCHs belonging to the PSFCH group are performed, the power limited case should not be reached.

Based on an embodiment of the present disclosure, only when the UE reserves (transmission) resources with a (transmission) resource reservation period longer than a pre-configured threshold value, the UE may be configured to apply restrictions on preemption resources. For example, only when the UE reserves a (transmission) resource with a (transmission) resource reservation period shorter than a pre-configured threshold, the UE may be configured to apply the restriction on the preemption resource. For example, the preemption resource may be a resource on which a preemption check is performed. For example, the restrictions may be restrictions on a (future) time domain.

For example, when the UE reserves a (transmission) resource with a (transmission) resource reservation period (P) longer than a (pre-configured) threshold, in the interval from (SL logical) slot #K to (SL logical) slot #(K+P), the UE may be configured to perform preemption check and/or application only for the reserved resources corresponding to (SL logical) period section including slot #(K+P) (for example, slot #(K+P) to slot #(K+2P−1)) and/or (SL logical) slot #(K+P), and the UE may be configured not to perform a preemption check and/or application for a subsequent (period-related) resource (hereinafter, F_RSC).

For example, when the UE reserves a (transmission) resource with a (transmission) resource reservation period (P) shorter than a (pre-configured) threshold, in the interval from (SL logical) slot #K to (SL logical) slot #(K+P), the UE may be configured to perform preemption check and/or application only for the reserved resources corresponding to (SL logical) period section including slot #(K+P) (for example, slot #(K+P) to slot #(K+2P−1)) and/or (SL logical) slot #(K+P), and the UE may be configured not to perform a preemption check and/or application for a subsequent (period-related) resource (hereinafter, F_RSC).

For example, (under the example situation described above) information on the (future) time interval in which the preemption check and/or application is performed and/or information on the number of resource reservation periods may be configured to the UE by the base station/network, or may be pre-configured. For example, (under the example situation described above) information on the (future) time interval in which the preemption check and/or application is performed and/or information on the number of resource reservation periods may be configured to the UE by the base station/network, or may be pre-configured, resource pool specifically. For example, (under the example situation described above) information on the (future) time interval in which the preemption check and/or application is performed and/or information on the number of resource reservation periods may be configured to the UE by the base station/network, or may be pre-configured, service type specifically. For example, (under the example situation described above) information on the (future) time interval in which the preemption check and/or application is performed and/or information on the number of resource reservation periods may be configured to the UE by the base station/network, or may be pre-configured, (resource pool) congestion level (for example, CBR) specifically.

For example, for a preemption check, and/or for a (preemption-based) resource reselection operation, the above-described proposed rule may be configured for the UE to be limitedly applied only when the resource reservation period is greater than the processing time T3 required for sensing and/or generating channel/signal (to be transmitted). For example, the UE may not perform preemption check and/or application for F_RSC.

For example, when the resource reservation period is less than or equal to the processing time (T3) required for sensing and/or generating channel/signal (to be transmitted) and the like, preemption check and/or application for F_RSC may be configured to be performed by a UE implementation. For example, when the resource reservation period is less than or equal to the processing time (T3) required for sensing and/or generating channel/signal (to be transmitted) and the like, only when the UE has MAC PDU and/or (interlocked) LCH related data to be transmitted on F_RSC, the UE may be configured to perform a preemption check and/or application for F_RSC. For example, when the resource reservation period is less than or equal to the processing time (T3) required for sensing and/or generating channel/signal (to be transmitted) and the like, the UE may be configured to always perform a preemption check and/or application for F_RSC.

Based on an embodiment of the present disclosure, when the UE converts the transmission resource reservation period (P_TX, millisecond) into the number of (SL logical) slots, the UE may acquire the number of (SL logical) slots based on the formula CEILING (N/Y*P_TX). Here, for example, the Y parameter may be the number of (interlocked) numerology (for example, sub-carrier spacing)-based (UL) slots signaled from the PSBCH existing within a 20 ms interval. For example, the Y parameter may be the total number of (actual) (UL) slots included in the (interlocked) numerology-based (UL) slots signaled from the PSBCH within a 20 ms interval (satisfying the number/position of symbols constituting the SL numerology and/or the SL slot) (based on Uu communication numerology). For example, the X parameter may be the number of (UL) slots that can be designated as SL slots. For example, the X parameter may be the number of (UL) slots to which a bitmap related to a resource pool for SL communication can be applied. In the present disclosure, for example, a slot may be interpreted (broadly) as a physical slot or (SL) logical slot.

Based on an embodiment of the present disclosure, the in-coverage UE in the (RRC) IDLE state located within the coverage of the network may not expect that SCS value and/or CP type/length of reference TDD UL/DL configuration used to derive TDD UL/DL configuration field value/configuration on PSBCH are configured (by the network/base station) differently from SCS value and/or CP type/length related to SL communication. For example, an out-of-coverage UE located outside the coverage of the network may not expect that SCS value and/or CP type/length of reference TDD UL/DL configuration used to derive TDD UL/DL configuration field value/configuration on PSBCH are configured (by the network/base station) differently from SCS value and/or CP type/length related to SL communication. For example, a UE may determine that SCS value and/or CP type/length of reference TDD UL/DL configuration used to derive TDD UL/DL configuration field value/configuration on PSBCH are the same as SCS value and/or CP type/length related to SL communication.

Whether the proposed rule of the present disclosure applies and/or related parameters may be configured for a UE in a resource pool-specific manner (or independently or differently). For example, whether the proposed rule of the present disclosure applies and/or related parameters may be configured for a UE in a service type-specific manner (or independently or differently). For example, whether the proposed rule of the present disclosure applies and/or related parameters may be configured for a UE in a service priority-specific manner (or independently or differently). For example, whether the proposed rule of the present disclosure applies and/or related parameters may be configured for a UE in a QoS requirement (for example, URLLC/EMBB traffic, reliability, latency)-specific manner (or independently or differently). For example, whether the proposed rule of the present disclosure applies and/or related parameters may be configured for a UE in a cast type (for example, unicast, groupcast, broadcast)-specific manner (or independently or differently). For example, whether the proposed rule of the present disclosure applies and/or related parameters may be configured for a UE in a (resource pool) congestion level (for example, CBR)-specific manner (or independently or differently). For example, whether the proposed rule of the present disclosure applies and/or related parameters may be configured for a UE in an SL HARQ feedback scheme (for example, NACK ONLY feedback, ACK/NACK feedback)-specific manner (or independently or differently). For example, whether the proposed rule of the present disclosure applies and/or related parameters may be configured independently or differently for a UE, depending on whether the resource reservation period is less than or greater than a pre-configured threshold. For example, whether the proposed rule of the present disclosure applies and/or related parameters may be configured independently or differently for a UE, depending on whether the PUCCH-based SL HARQ feedback reporting operation is configured or not.

Figure 15:
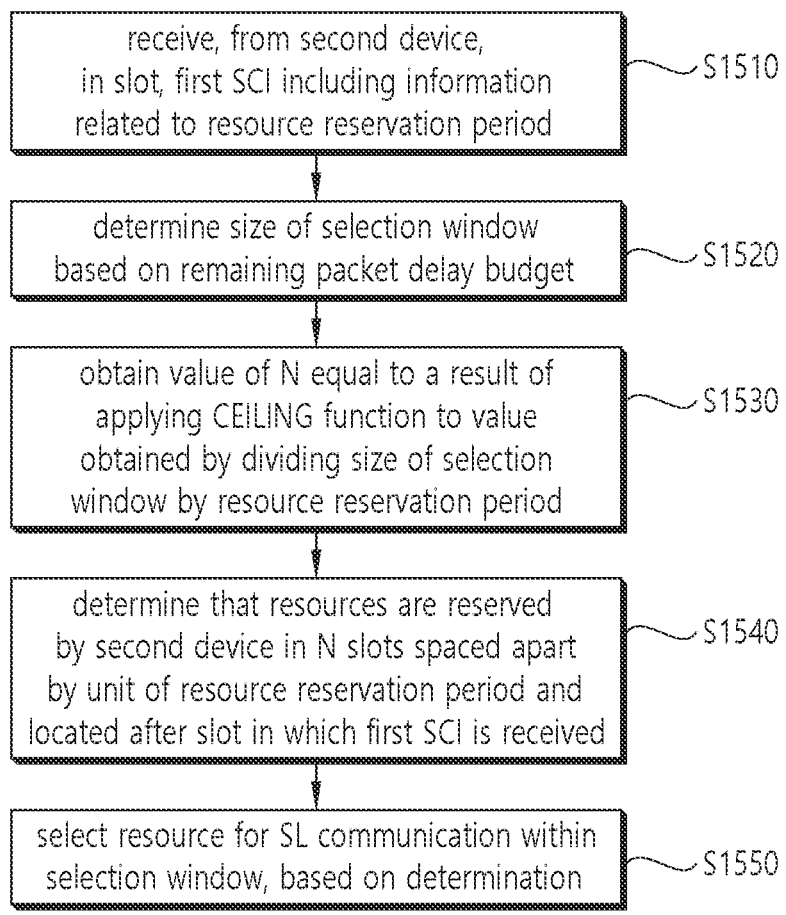
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, the first device may receive, on a slot from the second device, first sidelink control information (SCI) including information related to a resource reservation period. In step S1520, the first device may determine a size of a selection window based on a remaining packet delay budget. In step S1530, the first device may obtain a value of N by applying a CEILING function to a value obtained by dividing the size of the selection window by the resource reservation period. In step S1540, the first device may determine that the resource is reserved by the second device, on the N slots which is spaced apart by the unit of the resource reservation period, after the slot in which the first SCI is received. In step S1550, the first device may select a resource for SL communication within the selection window, based on the determination. For example, N may be a positive integer.

For example, at least one resource reserved by the first device on the N slots, spaced apart in units of the resource reservation period, may be excluded from candidate resources.

For example, the resource may include a physical sidelink control channel (PSCCH) resource and a physical sidelink shared channel (PSSCH) resource. For example, based on that the number of resource blocks (RBs) included in the subchannel of the PSCCH resource is the same as the number of RBs included in the subchannel of the PSSCH resource, a demodulation reference signal (DMRS) for PSSCH may be mapped on the PSSCH resources that are not overlapped with the time domain of the PSCCH resource, and the second SCI may be mapped from the first symbol to which the DMRS for the PSSCH is mapped. Additionally, for example, the first device may transmit the second SCI, based on the PSSCH resource.

Additionally, for example, the first device may transmit the first SCI to the third device based on the PSCCH resource, and the first device may transmit the second SCI and data to the third device based on the PSSCH resource. For example, the second SCI may be any one of second SCI format A or second SCI format B, the second SCI format A may include cast type information indicating a combination of a HARQ feedback type and a cast type, and the second SCI format B may include information related to an ID of a zone related to the first device and information related to a communication range requirement.

Additionally, for example, based on (i) the second SCI is the second SCI format A, and (ii) the cast type information indicates a groupcast type and an ACK/NACK-based HARQ feedback type, the first device may determine a physical sidelink feedback channel (PSFCH) resource related to the PSSCH resource based on the member ID of the third device. For example, the member ID of the third device may be an ID provided from a higher layer of the third device.

Additionally, for example, based on (i) the second SCI is the second SCI format A, and (ii) the cast type information indicates a groupcast type and only NACK-based HARQ feedback type, the first device may determine the PSFCH resource related to the PSSCH resource based on the member ID of the third device. For example, the member ID of the third device may be zero.

Additionally, for example, based on that the second SCI is the second SCI format B, the first device may determine the PSFCH resource related to the PSSCH resource based on the member ID of the third device. For example, the member ID of the third device may be zero.

Additionally, for example, the first device may perform reference signal received power (RSRP) measurement on a resource scheduled by the first SCI. For example, based on that the result value of the RSRP measurement is greater than the RSRP threshold, at least one resource reserved by the first device on the N slots spaced apart in units of the resource reservation period may be excluded from the candidate resources.

For example, the first SCI may include a first priority related with the transmission of the second device, and the RSRP threshold may be determined based on the first priority and a second priority related to the transmission of the first device.

For example, the size of the selection window may be determined based on quality of service (QoS) requirements.

For example, based on the size of the selection window being larger than the resource reservation period, the value of N may be obtained by applying the Ceiling function to a value obtained by dividing the size of the selection window by the resource reservation period.

The proposed method may be applied to an apparatus according to various embodiments of the present disclosure. First, the processor 102 of the first device 100 may control the transceiver 106 to receive first sidelink control information (SCI) including information related to a resource reservation period, from the second device on a slot. In addition, the processor 102 of the first device 100 may determine a size of a selection window based on a remaining packet delay budget. In addition, the processor 102 of the first device 100 may obtain a value of N by applying a Ceiling function to a value obtained by dividing the size of the selection window by the resource reservation period. Then, the processor 102 of the first device 100 may determine that resources are reserved by the second device, on N slots spaced apart by a unit of the resource reservation period, after the slot in which the first SCI is received. In addition, the processor 102 of the first device 100 may select a resource for SL communication within the selection window, based on the determination. For example, N may be a positive integer.

Based on an embodiment of the present disclosure, a first device configured to perform wireless communication may be provided. For example, the first device may comprise one or more memories storing instructions; one or more transceivers; and one or more processors connected to the one or more memories and the one or more transceivers. The one or more processors may execute the instructions to: receive first sidelink control information (SCI) including information related to a resource reservation period, on a slot from a second device; determine a size of a selection window based on a remaining packet delay budget; obtain a value of N by applying a CEILING function to a value obtained by dividing the size of the selection window by the resource reservation period; determine that resources are reserved by the second device, on N slots spaced apart by a unit of the resource reservation period, after the slot in which the first SCI is received; and select a resource for SL communication within the selection window, based on the determination. For example, the N may be a positive integer.

Based on an embodiment of the present disclosure, an apparatus configured to control a first user equipment (UE) may be provided. The apparatus may comprise one or more processors; and one or more memories operably connected to the one or more processors and storing instructions. The one or more processors may execute the instructions to: receive first sidelink control information (SCI) including information related to a resource reservation period, on a slot from a second UE; determine a size of a selection window based on a remaining packet delay budget; obtain a value of N by applying a CEILING function to a value obtained by dividing the size of the selection window by the resource reservation period; determine that resources are reserved by the second UE, on N slots spaced apart by a unit of the resource reservation period, after the slot in which the first SCI is received; and select a resource for SL communication within the selection window, based on the determination. For example, the N may be a positive integer.

Based on an embodiment of the present disclosure, a non-transitory computer readable storage medium storing instructions may be provided. The instructions, when executed by one or more processors, may cause the one or more processors to: receive, by a first device, first sidelink control information (SCI) including information related to a resource reservation period, on a slot from a second UE; determine, by the first device, a size of a selection window based on a remaining packet delay budget; obtain, by the first device, a value of N by applying a CEILING function to a value obtained by dividing the size of the selection window by the resource reservation period; determine, by the first device, that resources are reserved by the second UE, on N slots spaced apart by a unit of the resource reservation period, after the slot in which the first SCI is received; and select, by the first device, a resource for SL communication within the selection window, based on the determination. For example, the N may be a positive integer.

Figure 16:
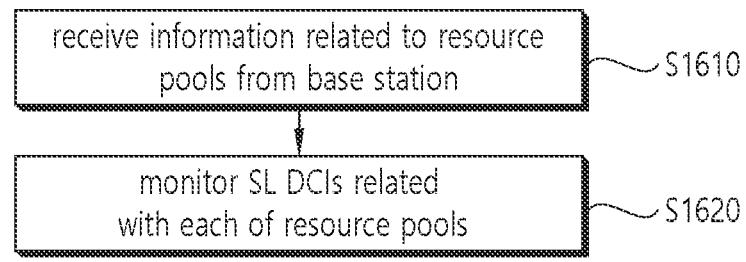
FIG. 16 shows a method for a device to perform wireless communication, based on an embodiment of the present disclosure.

FIG. 16 shows a method for a device to perform wireless communication, based on an embodiment of the present disclosure. The embodiment of FIG. 16 may be combined with various embodiments of the present disclosure.

Referring to FIG. 16, in step S1610, the device may receive information related to a plurality of resource pools from the base station. In step S1620, the device may monitor a plurality of sidelink (SL) downlink control information (DCI) related with each of the plurality of resource pools. For example, the plurality of SL DCIs may include information for scheduling SL resources on the plurality of resource pools. For example, before at least one zero bit is appended to the plurality of SL DCIs, the size of the first SL DCI may be the largest among the sizes of the plurality of SL DCIs. For example, based on that the plurality of resource pools are configured for the device, the sizes of the plurality of SL DCIs to which the at least one zero bit is appended may be the same as the size of the first SL DCI.

For example, the at least one zero bit may be appended to the plurality of SL DCIs, until the sizes of the plurality of SL DCIs are the same as the size of the first SL DCI.

Additionally, for example, the device may monitor long term evolution (LTE) SL DCI. For example, the plurality of SL DCIs may be DCIs for scheduling NR SL resources, the LTE SL DCI may be a DCI for scheduling LTE SL resources. For example, based on that the size of the LTE SL DCI, before the at least one zero bit is appended, is smaller than the size of the first SL DCI, the size of the LTE SL DCI, to which the at least one zero bit is appended, may be the same as the size of the first SL DCI. For example, the at least one zero bit may be appended to the LTE SL DCI, until the size of the LTE SL DCI is the same as the size of the first SL DCI. For example, based on that the size of the first SL DCI, before the at least one zero bit is appended, is smaller than the size of the LTE SL DCI, the sizes of the plurality of SL DCIs, to which the at least one zero bit is appended, may be the same as the size of the LTE SL DCI. For example, the at least one zero bit may be appended to the plurality of SL DCIs, until the sizes of the plurality of SL DCIs are the same as the size of the LTE SL DCI.

Additionally, for example, the device may monitor a Uu DCI for scheduling an uplink (UL) resource or a downlink (DL) resource. For example, based on that the number of different DCI sizes configured to monitor exceeds the DCI format budget, the sizes of the plurality of SL DCIs, to which the at least one zero bit is appended, may be the same as the size of the Uu DCI. For example, the at least one zero bit may be appended to the plurality of SL DCIs, until the sizes of the plurality of SL DCIs are the same as the size of the Uu DCI.

The proposed method may be applied to the device(s) according to various embodiments of the present disclosure. First, the processor 102 of the device 100 may control the transceiver 106 to receive information related to a plurality of resource pools from the base station. In addition, the processor 102 of the device 100 may control the transceiver 106 to monitor a plurality of sidelink (SL) downlink control information (DCI) related with each of the plurality of resource pools. For example, the plurality of SL DCIs may include information for scheduling SL resources on the plurality of resource pools. For example, before at least one zero bit is appended to the plurality of SL DCIs, the size of the first SL DCI may be the largest among the sizes of the plurality of SL DCIs. For example, based on that the plurality of resource pools are configured for the device, the sizes of the plurality of SL DCIs, to which the at least one zero bit is appended, may be the same as the size of the first SL DCI.

Based on an embodiment of the present disclosure, a device configured to perform wireless communication may be provided. For example, the device may comprise one or more memories storing instructions; one or more transceivers; and one or more processors connected to the one or more memories and the one or more transceivers. For example, the one or more processors may execute the instructions to: receive information related to a plurality of resource pools from the base station; and monitor a plurality of sidelink (SL) downlink control information (DCI) related with each of the plurality of resource pools. For example, the plurality of SL DCIs may include information for scheduling SL resources on the plurality of resource pools. For example, before at least one zero bit is appended to the plurality of SL DCIs, the size of the first SL DCI may be the largest among the sizes of the plurality of SL DCIs. For example, based on that the plurality of resource pools are configured for the device, the sizes of the plurality of SL DCIs, to which the at least one zero bit is appended, may be the same as the size of the first SL DCI.

Based on an embodiment of the present disclosure, an apparatus configured to control a user equipment (UE) may be provided. The apparatus may comprise one or more processors; and one or more memories operably connected to the one or more processors and storing instructions. The one or more processors may execute the instructions to: receive information related to a plurality of resource pools from the base station; and monitor a plurality of sidelink (SL) downlink control information (DCI) related with each of the plurality of resource pools. For example, the plurality of SL DCIs may include information for scheduling SL resources on the plurality of resource pools. For example, before at least one zero bit is appended to the plurality of SL DCIs, the size of the first SL DCI may be the largest among the sizes of the plurality of SL DCIs. For example, based on that the plurality of resource pools are configured for the UE, the sizes of the plurality of SL DCIs, to which the at least one zero bit is appended, may be the same as the size of the first SL DCI.

Based on an embodiment of the present disclosure, a non-transitory computer readable storage medium storing instructions may be provided. The instructions, when executed by one or more processors, may cause the one or more processors to: receive information related to a plurality of resource pools from the base station; and monitor a plurality of sidelink (SL) downlink control information (DCI) related with each of the plurality of resource pools. For example, the plurality of SL DCIs may include information for scheduling SL resources on the plurality of resource pools. For example, before at least one zero bit is appended to the plurality of SL DCIs, the size of the first SL DCI may be the largest among the sizes of the plurality of SL DCIs. For example, based on that the plurality of resource pools are configured for the device, the sizes of the plurality of SL DCIs, to which the at least one zero bit is appended, may be the same as the size of the first SL DCI.

Figure 17:
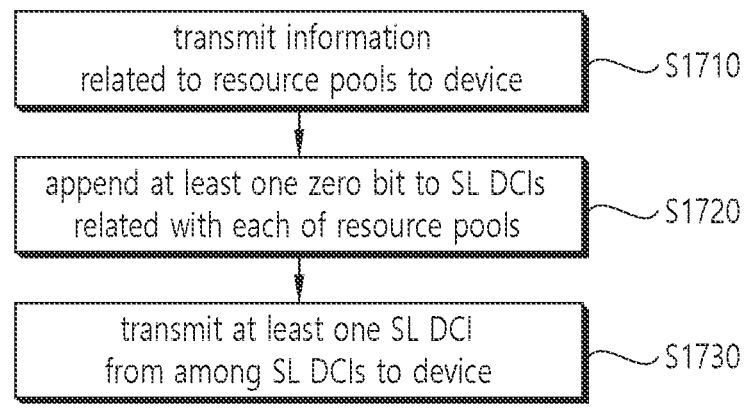
FIG. 17 shows a method for a base station configured to perform wireless communication, based on an embodiment of the present disclosure.

FIG. 17 shows a method for a base station configured to perform wireless communication, based on an embodiment of the present disclosure. The embodiment of FIG. 17 may be combined with various embodiments of the present disclosure.

Referring to FIG. 17, in step S1710, the base station may transmit information related to a plurality of resource pools to a device. In step S1720, the base station may append at least one zero bit to a plurality of sidelink (SL) downlink control information (DCI) related with each of the plurality of resource pools. In step S1730, the base station may transmit at least one SL DCI from among the plurality of SL DCIs to the device. For example, the plurality of SL DCIs may include information for scheduling SL resources on the plurality of resource pools. For example, before the at least one zero bit is appended to the plurality of SL DCIs, the size of the first SL DCI may be the largest among the sizes of the plurality of SL DCIs. For example, based on that the plurality of resource pools are configured for the device, the at least one zero bit may be appended to the plurality of SL DCIs, until the sizes of the plurality of SL DCIs are the same as the size of the first SL DCI.

Additionally, for example, the base station may transmit a long term evolution (LTE) SL DCI to the device. For example, the plurality of SL DCIs may be DCIs for scheduling NR SL resources, and the LTE SL DCI may be a DCI for scheduling LTE SL resources. For example, based on that the size of the LTE SL DCI, before the at least one zero bit is appended, is smaller than the size of the first SL DCI, the at least one zero bit may be appended to the LTE SL DCI until the size of the LTE SL DCI is same as the size of the first SL DCI. For example, based on that the size of the first SL DCI, before the at least one zero bit is appended, is smaller than the size of the LTE SL DCI, the at least one zero bit may be appended to the plurality of SL DCIs until the sizes of the plurality of SL DCIs are the same as the size of the LTE SL DCI.

The proposed method may be applied to the device(s) according to various embodiments of the present disclosure. First, the processor 202 of the base station 200 may control the transceiver 206 to transmit information related to a plurality of resource pools to a device. In addition, the processor 202 of the base station 200 may append at least one zero bit to a plurality of sidelink (SL) downlink control information (DCI) related with each of the plurality of resource pools. In addition, the processor 202 of the base station 200 may control the transceiver 206 to transmit at least one SL DCI from among the plurality of SL DCIs to the device. For example, the plurality of SL DCIs may include information for scheduling SL resources on the plurality of resource pools. For example, before the at least one zero bit is appended to the plurality of SL DCIs, the size of the first SL DCI may be the largest among the sizes of the plurality of SL DCIs. For example, based on that the plurality of resource pools are configured for the device, the at least one zero bit may be appended to the plurality of SL DCIs, until the sizes of the plurality of SL DCIs are the same as the size of the first SL DCI.

Based on an embodiment of the present disclosure, a base station configured to perform wireless communication may be provided. For example, the base station may comprise one or more memories storing instructions; one or more transceivers; and one or more processors connected to the one or more memories and the one or more transceivers. For example, the one or more processors may execute the instructions to: transmit information related to a plurality of resource pools to a device; append at least one zero bit to a plurality of sidelink (SL) downlink control information (DCI) related with each of the plurality of resource pools; and transmit at least one SL DCI from among the plurality of SL DCIs to the device. For example, the plurality of SL DCIs may include information for scheduling SL resources on the plurality of resource pools. For example, before the at least one zero bit is appended to the plurality of SL DCIs, the size of the first SL DCI may be the largest among the sizes of the plurality of SL DCIs. For example, based on that the plurality of resource pools are configured for the device, the at least one zero bit may be appended to the plurality of SL DCIs, until the sizes of the plurality of SL DCIs are the same as the size of the first SL DCI.

Based on an embodiment of the present disclosure, an apparatus configured to control a base station may be provided. For example, the apparatus may comprise one or more processors; and one or more memories operably connected to the one or more processors and storing instructions. For example, the one or more processors may execute the instructions to: transmit information related to a plurality of resource pools to a user equipment (UE); append at least one zero bit to a plurality of sidelink (SL) downlink control information (DCI) related with each of the plurality of resource pools; and transmit at least one SL DCI from among the plurality of SL DCIs to the UE. For example, the plurality of SL DCIs may include information for scheduling SL resources on the plurality of resource pools. For example, before the at least one zero bit is appended to the plurality of SL DCIs, the size of the first SL DCI may be the largest among the sizes of the plurality of SL DCIs. For example, based on that the plurality of resource pools are configured for the UE, the at least one zero bit may be appended to the plurality of SL DCIs, until the sizes of the plurality of SL DCIs are the same as the size of the first SL DCI.

Based on an embodiment of the present disclosure, a non-transitory computer readable storage medium storing instructions may be provided. The instructions, when executed by one or more processors, may cause the one or more processors to: transmit information related to a plurality of resource pools to a device; append at least one zero bit to a plurality of sidelink (SL) downlink control information (DCI) related with each of the plurality of resource pools; and transmit at least one SL DCI from among the plurality of SL DCIs to the device. For example, the plurality of SL DCIs may include information for scheduling SL resources on the plurality of resource pools. For example, before the at least one zero bit is appended to the plurality of SL DCIs, the size of the first SL DCI may be the largest among the sizes of the plurality of SL DCIs. For example, based on that the plurality of resource pools are configured for the device, the at least one zero bit may be appended to the plurality of SL DCIs, until the sizes of the plurality of SL DCIs are the same as the size of the first SL DCI.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
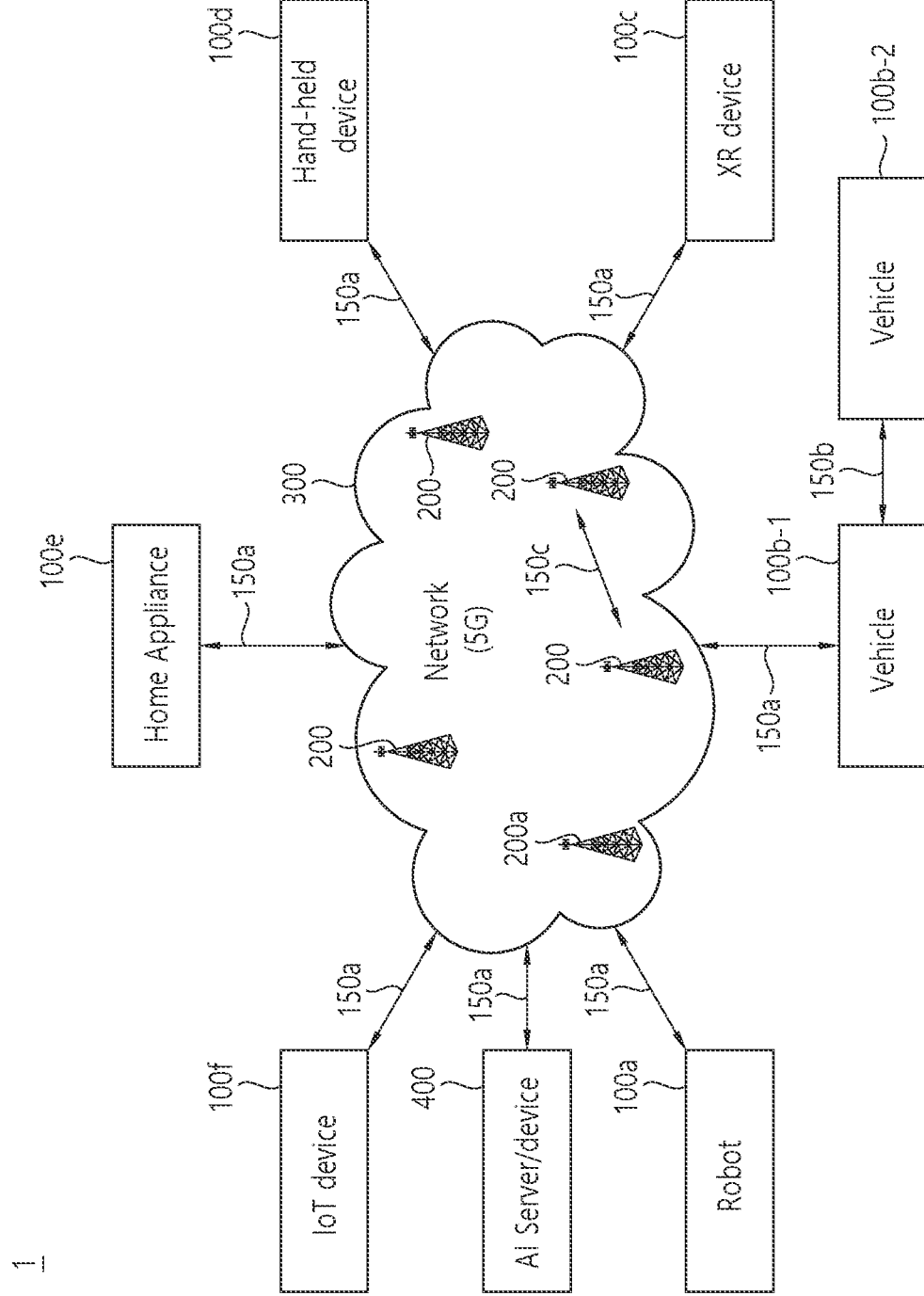
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
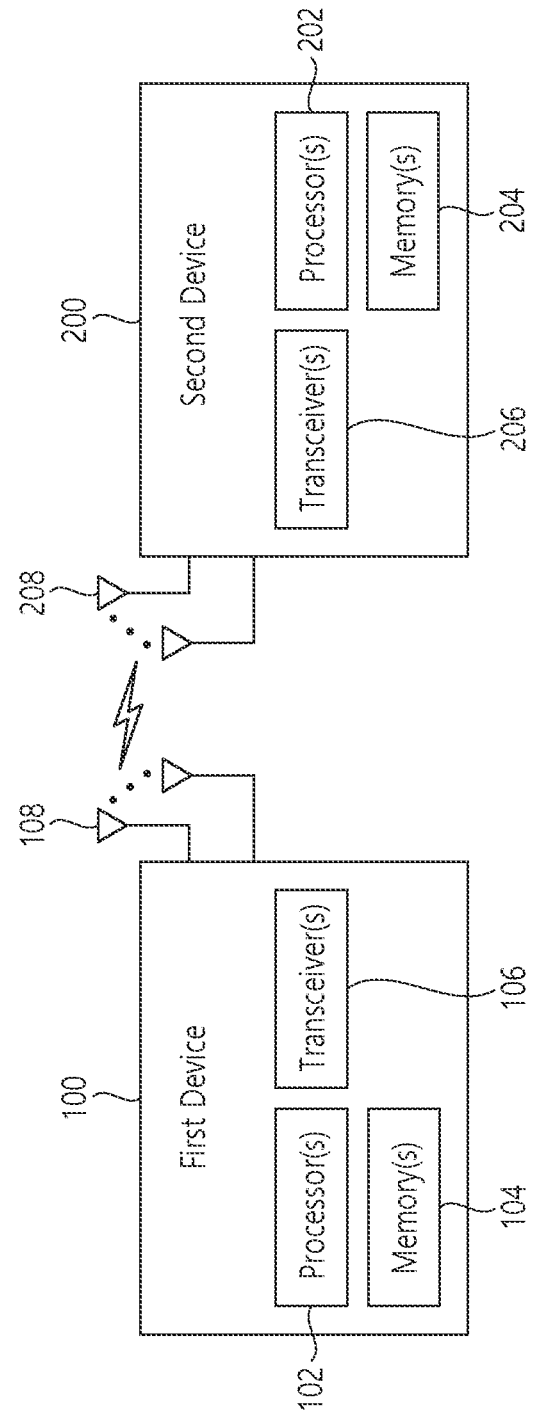
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
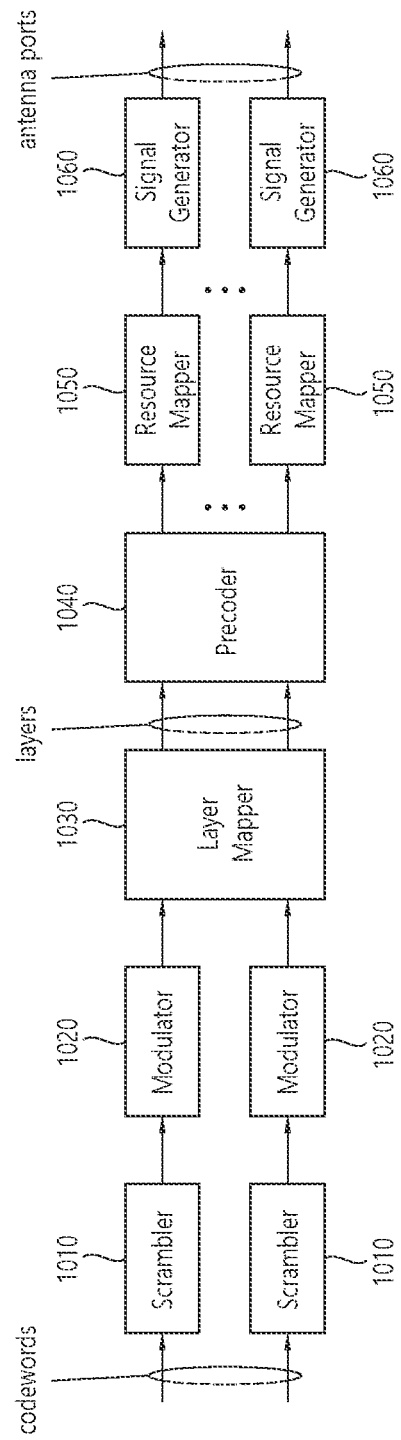
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
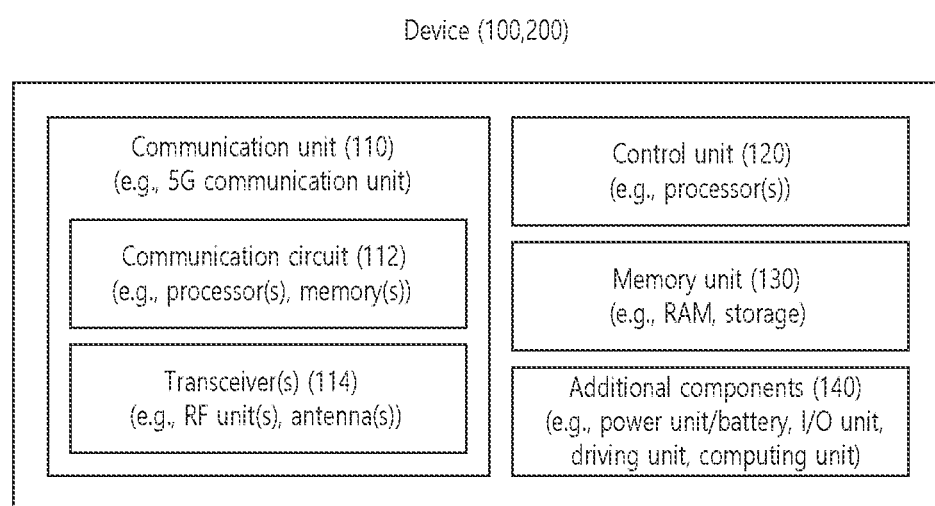
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
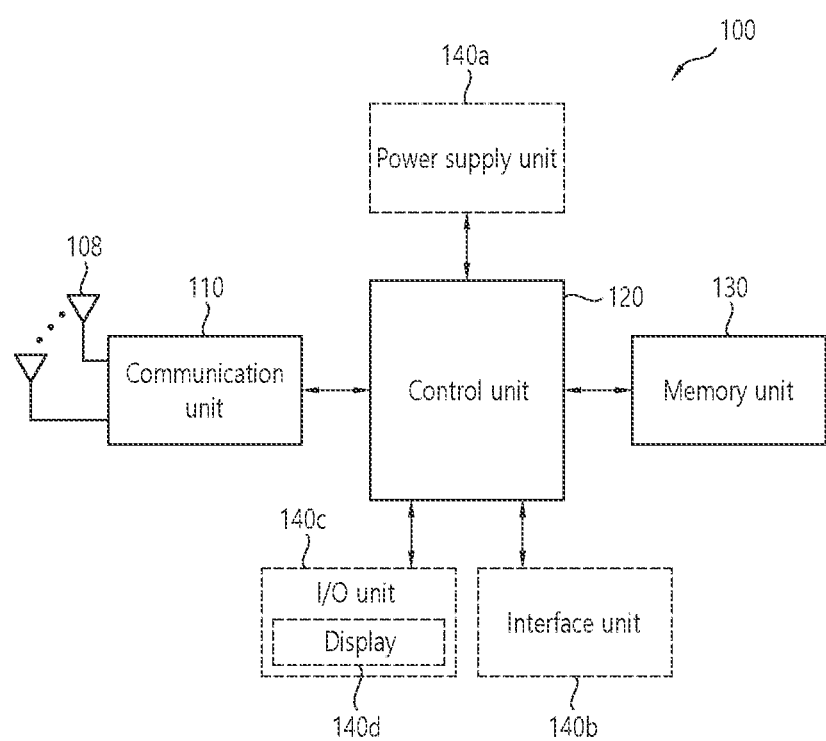
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 23:
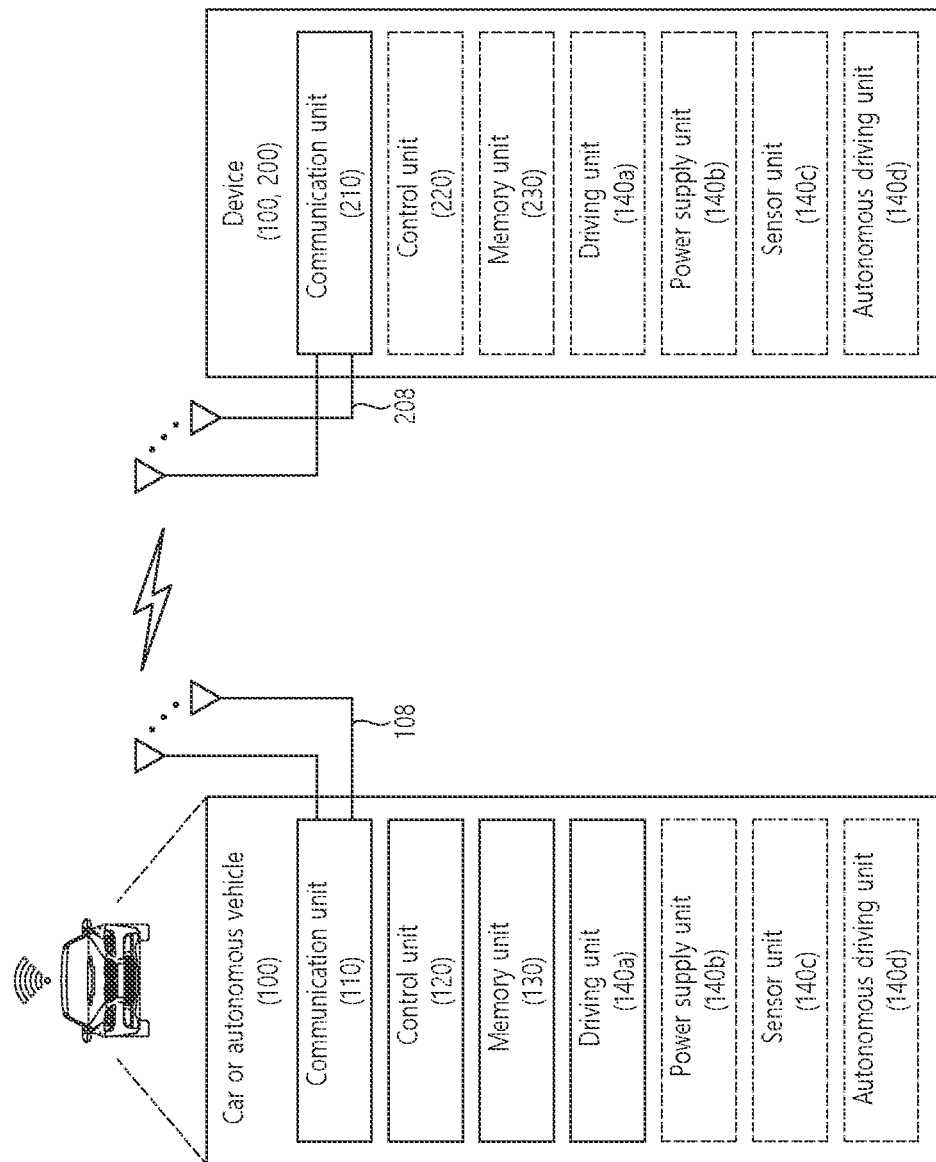
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving, from a second device, in a slot, a first sidelink control information (SCI) including information related to a resource reservation period;
   determining a size of a selection window based on a remaining packet delay budget;
   obtaining a value of N which is equal to a result of applying a CEILING function to a value obtained by dividing the size of the selection window by the resource reservation period;
   determining that resources are reserved by the second device in N slots located after the slot in which the first SCI is received; and
   selecting a resource for SL communication within the selection window, based on the determination,
   wherein the N is a positive integer.

2. The method of claim 1, wherein at least one resource reserved by the first device in the N slots is excluded from candidate resources.

3. The method of claim 1, wherein the resource includes a physical sidelink control channel (PSCCH) resource and a physical sidelink shared channel (PSSCH) resource.

4. The method of claim 3, wherein, based on that a number of resource blocks (RBs) included in a subchannel of the PSCCH resource and a number of RBs included in a subchannel of the PSSCH resource are the same, a demodulation reference signal (DMRS) for the PSSCH is mapped on the PSSCH resource which is not overlapped with a time domain of the PSCCH resource, and a second SCI is mapped from a symbol, to which the DMRS for the PSSCH is mapped first.

5. The method of claim 4, further comprising:
   transmitting the second SCI, based on the PSSCH resource.

6. The method of claim 1, further comprising:
   transmitting, based on the resource, a second SCI and data through a physical sidelink shared channel (PSSCH),
   wherein the second SCI is second SCI format A or second SCI format B,
   wherein the second SCI format A includes cast type information informing a combination of a HARQ feedback type and a cast type, and
   wherein the second SCI format B includes information related to an ID of a zone related with the first device and information related to a communication range requirement.

7. The method of claim 6, further comprising:
   determining a physical sidelink feedback channel (PSFCH) resource related to the PSSCH based on an identity of a device receiving the PSSCH, based on that (i) the second SCI is the second SCI format A, and (ii) the cast type information informs a groupcast type and an ACK/NACK-based HARQ feedback type,
   wherein the identity of the device is provided from a higher layer of the device.

8. The method of claim 6, further comprising:
   determining a PSFCH resource related to the PSSCH based on an identity which is set to zero, based on that (i) the second SCI is the second SCI format A, and (ii) the cast type information informs a groupcast type and only NACK-based HARQ feedback type.

9. The method of claim 6, further comprising:
   determining a PSFCH resource related to the PSSCH based on an identity which is set to zero, based on that the second SCI is the second SCI format B.

10. The method of claim 1, further comprising:
    performing reference signal received power (RSRP) measurement on a resource scheduled by the first SCI,
    wherein, based on that a result value of the RSRP measurement is greater than a RSRP threshold, at least one resource reserved by the first device in the N slots is excluded from candidate resources.

11. The method of claim 10, wherein the first SCI includes a first priority related with transmission of the second device, and
    wherein the RSRP threshold is determined based on the first priority and a second priority related with transmission of the first device.

12. The method of claim 1, wherein the size of the selection window is determined based on quality of service (QoS) requirements.

13. The method of claim 1, wherein the value of N is obtained based on that the size of the selection window is larger than the resource reservation period.

14. A first device adapted to perform wireless communication, the first device comprising:
    one or more transceivers; and
    one or more processors connected to the one or more transceivers; and
    one or more memories connected to the one or more processors and storing instructions that, when executed by the one or more processors, control the first device to perform operations comprising:

receiving, from a second device, in a slot, a first sidelink control information (SCI) including information related to a resource reservation period;

determining a size of a selection window based on a remaining packet delay budget;

obtaining a value of N which is equal to a result of applying a CEILING function to a value obtained by dividing the size of the selection window by the resource reservation period;

determining that resources are reserved by the second device in N slots located after the slot in which the first SCI is received; and selecting a resource for SL communication within the selection window, based on the determination, wherein the N is a positive integer.

15. The first device of claim 14, wherein at least one resource reserved by the first device in the N slots is excluded from candidate resources.

16. The first device of claim 14, wherein the resource includes a physical sidelink control channel (PSCCH) resource and a physical sidelink shared channel (PSSCH) resource.

17. The first device of claim 16, wherein, based on that a number of resource blocks (RBs) included in a subchannel of the PSCCH resource and a number of RBs included in a subchannel of the PSSCH resource are the same, a demodulation reference signal (DMRS) for the PSSCH is mapped on the PSSCH resource which is not overlapped with a time domain of the PSCCH resource, and a second SCI is mapped from a symbol, to which the DMRS for the PSSCH is mapped first.

18. The first device of claim 17, wherein the operations further comprise:

transmitting the second SCI, based on the PSSCH resource.

19. The first device of claim 14, wherein the operations further comprise:

transmitting, based on the resource, a second SCI and data through a physical sidelink shared channel (PSSCH), wherein the second SCI is second SCI format A or second SCI format B, wherein the second SCI format A includes cast type information informing a combination of a HARQ feedback type and a cast type, and wherein the second SCI format B includes information related to an ID of a zone related with the first device and information related to a communication range requirement.

20. A processing device adapted to control a first device, the processing device comprising:

one or more processors; and one or more memories connected to the one or more processors and storing instructions that, when executed by the one or more processors, control the first device to perform operations comprising:

receiving, from a second device, in a slot, a first sidelink control information (SCI) including information related to a resource reservation period;

determining a size of a selection window based on a remaining packet delay budget;

obtaining a value of N which is equal to a result of applying a CEILING function to a value obtained by dividing the size of the selection window by the resource reservation period;

determining that resources are reserved by the second device in N slots located after the slot in which the first SCI is received; and selecting a resource for SL communication within the selection window, based on the determination, wherein the N is a positive integer.

* * * * *